United States Patent
Nam et al.

(10) Patent No.: US 11,985,597 B2
(45) Date of Patent: May 14, 2024

(54) TECHNIQUES FOR APERIODIC DISCONTINUOUS RECEPTION MODE COMMUNICATIONS

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/395,448

(22) Filed: Aug. 5, 2021

(65) Prior Publication Data

US 2023/0038515 A1 Feb. 9, 2023

(51) Int. Cl.
*H04W 52/02* (2009.01)
*H04L 1/00* (2006.01)
(Continued)

(52) U.S. Cl.
CPC ....... *H04W 52/0232* (2013.01); *H04L 1/0025* (2013.01); *H04L 1/1819* (2013.01); *H04L 1/1896* (2013.01); *H04W 76/28* (2018.02)

(58) Field of Classification Search
CPC .............. H04W 52/0232; H04W 76/28; H04L 1/0025; H04L 1/1819; H04L 1/1896
See application file for complete search history.

(56) References Cited

U.S. PATENT DOCUMENTS 11,252,669 B2 * 2/2022 Annam .............. H04W 52/0216
11,412,568 B2 * 8/2022 Babaei .................. H04W 76/28
(Continued)

FOREIGN PATENT DOCUMENTS

| CA | 3135030 A1 | 10/2020 |
|---|---|---|
| WO | WO-2020220322 A1 | 11/2020 |

(Continued)

OTHER PUBLICATIONS

CATT: "UE Power Saving Schemes with Power Saving Signal/Channel/Procedures", 3GPP TSG RAN WG1 Ad-Hoc Meeting 1901, R1-1900345, 3RD Generation Partnership Project, Mobile Competence Centre, 650, Route Des Lucioles, F-06921 Sophia-Antipolis Cedex, France, vol. RAN WG1, No. Taipei, Jan. 21, 2019-Jan. 25, 2019 Jan. 12, 2019, XP051575954, 17 Pages, paragraph [2.2.1] figure 3.

(Continued)

*Primary Examiner* — Dung B Huynh
(74) *Attorney, Agent, or Firm* — Holland & Hart LLP

(57) ABSTRACT

Methods, systems, and devices for wireless communication are described. A wireless communications system may support one or more communication devices (e.g., user equipment (UE)) operating according to an aperiodic (e.g., and dynamic) discontinuous reception (DRX) mode. For example, a UE may communicate with a device in the wireless communications system (e.g., a base station, another UE) according to a periodic DRX mode. In response to a transition indication, the UE may dynamically transition to the aperiodic DRX mode and may operate according to the aperiodic DRX mode for a duration. To operate according to the aperiodic DRX mode, the UE may be configured to disable a first set of communication operations for the duration, perform a second set of communication operations during the duration, or a combination thereof (e.g., across component carriers of a carrier group, across component carriers of a DRX group).

42 Claims, 20 Drawing Sheets

(51) Int. Cl.
  *H04L 1/1812* (2023.01)
  *H04L 1/1867* (2023.01)
  *H04W 76/28* (2018.01)

(56) References Cited

U.S. PATENT DOCUMENTS

| | | | |
|---|---|---|---|
| 2006/0209682 A1* | 9/2006 | Filsfils | H04L 45/502 370/219 |
| 2007/0230400 A1* | 10/2007 | Kuchibhotla | H04W 76/28 455/436 |
| 2009/0103437 A1* | 4/2009 | Kim | H04W 74/0808 370/235 |
| 2009/0323634 A1* | 12/2009 | Kim | H04W 74/08 370/329 |
| 2010/0034145 A1* | 2/2010 | Kim | H04W 76/28 370/328 |
| 2010/0112956 A1* | 5/2010 | Jeong | H04B 17/309 455/67.11 |
| 2010/0118752 A1* | 5/2010 | Suzuki | H04W 76/28 370/311 |
| 2010/0272035 A1* | 10/2010 | Park | H04W 74/0866 370/329 |
| 2010/0297993 A1* | 11/2010 | Heo | H04W 72/21 455/423 |
| 2011/0003555 A1* | 1/2011 | Guo | H04B 17/382 455/67.11 |
| 2011/0105173 A1* | 5/2011 | Haim | H04W 52/34 455/522 |
| 2011/0199951 A1* | 8/2011 | Kwon | H04W 52/0212 370/311 |
| 2011/0292854 A1* | 12/2011 | Terry | H04L 5/0098 370/329 |
| 2011/0317627 A1* | 12/2011 | Kato | H04L 5/0098 370/328 |
| 2012/0002635 A1* | 1/2012 | Chung | H04L 5/0053 370/329 |
| 2012/0057490 A1* | 3/2012 | Park | H04W 76/28 370/252 |
| 2012/0230319 A1* | 9/2012 | Zaitsu | H04W 52/0229 370/328 |
| 2012/0315862 A1* | 12/2012 | Okano | H04W 4/90 455/73 |
| 2013/0010720 A1* | 1/2013 | Lohr | H04L 1/0046 370/329 |
| 2013/0028223 A1* | 1/2013 | Kim | H04W 72/0446 370/329 |
| 2013/0039202 A1* | 2/2013 | Feuersanger | H04L 5/001 370/252 |
| 2013/0044674 A1* | 2/2013 | Teyeb | H04W 52/0216 370/315 |
| 2013/0053082 A1* | 2/2013 | Chai | H04B 17/391 455/67.11 |
| 2013/0114488 A1* | 5/2013 | Fang | H04W 52/0206 370/311 |
| 2014/0241171 A1* | 8/2014 | Moon | H04W 24/10 370/242 |
| 2014/0254538 A1* | 9/2014 | Park | H04L 1/1874 370/329 |
| 2015/0043485 A1* | 2/2015 | Masuda | H04W 52/346 370/329 |
| 2015/0092645 A1* | 4/2015 | Tabet | H04L 1/1812 370/311 |
| 2015/0117284 A1* | 4/2015 | Baldemair | H04W 52/0216 370/311 |
| 2015/0119039 A1* | 4/2015 | Virtej | H04W 24/10 455/436 |
| 2015/0230112 A1* | 8/2015 | Siomina | H04W 72/0453 370/252 |
| 2015/0282080 A1* | 10/2015 | Maattanen | H04W 76/28 370/311 |
| 2015/0296458 A1* | 10/2015 | Abraham | H04W 56/001 370/350 |
| 2015/0327324 A1* | 11/2015 | Wei | H04W 76/28 370/280 |
| 2016/0081044 A1* | 3/2016 | Wang | H04W 52/365 370/329 |
| 2016/0088532 A1* | 3/2016 | Chen | H04W 36/0077 370/331 |
| 2016/0095137 A1* | 3/2016 | Chen | H04L 5/0048 370/329 |
| 2016/0242162 A1* | 8/2016 | Yao | H04W 72/0406 |
| 2016/0286601 A1* | 9/2016 | Siomina | H04W 76/28 |
| 2016/0295636 A1* | 10/2016 | Yang | H04L 5/006 |
| 2016/0302224 A1* | 10/2016 | Khairmode | H04L 5/0055 |
| 2016/0334994 A1* | 11/2016 | Yokota | A63F 13/235 |
| 2016/0345193 A1* | 11/2016 | Takahashi | G01S 5/0036 |
| 2017/0006476 A1* | 1/2017 | Cao | H04W 72/23 |
| 2017/0208619 A1* | 7/2017 | Yang | H04W 72/1284 |
| 2017/0303215 A1* | 10/2017 | Kim | H04W 52/48 |
| 2017/0359160 A1* | 12/2017 | Ji | H04W 52/0229 |
| 2018/0007686 A1* | 1/2018 | Lyu | H04L 5/0053 |
| 2018/0098362 A1* | 4/2018 | Yamauchi | H04W 74/085 |
| 2018/0152961 A1* | 5/2018 | Yamazaki | H04W 28/0278 |
| 2018/0152978 A1* | 5/2018 | Jia | H04W 76/28 |
| 2018/0160361 A1* | 6/2018 | Yi | H04W 48/10 |
| 2018/0191478 A1* | 7/2018 | Uhling | H04L 5/0055 |
| 2018/0213452 A1* | 7/2018 | Kim | H04L 5/0091 |
| 2018/0227329 A1* | 8/2018 | Lv | H04L 63/04 |
| 2018/0279229 A1* | 9/2018 | Dinan | H04W 52/367 |
| 2018/0352511 A1* | 12/2018 | Martin | H04W 52/0216 |
| 2019/0028967 A1* | 1/2019 | Ahn | H04W 52/0216 |
| 2019/0029026 A1* | 1/2019 | Yun | H04J 11/003 |
| 2019/0174466 A1* | 6/2019 | Zhang | H04L 5/005 |
| 2019/0199477 A1* | 6/2019 | Park | H04L 1/00 |
| 2019/0215117 A1* | 7/2019 | Lee | H04L 5/0051 |
| 2019/0215890 A1* | 7/2019 | Choi | H04W 8/24 |
| 2019/0239212 A1* | 8/2019 | Wang | H04W 72/0413 |
| 2019/0349120 A1* | 11/2019 | Cheng | H04W 76/28 |
| 2020/0015166 A1* | 1/2020 | Ahn | H04W 52/0219 |
| 2020/0015313 A1* | 1/2020 | Reial | H04B 7/0617 |
| 2020/0022032 A1* | 1/2020 | Tenny | H04W 36/0027 |
| 2020/0022175 A1* | 1/2020 | Xiong | H04L 1/1861 |
| 2020/0112919 A1* | 4/2020 | Nam | H04B 7/0617 |
| 2020/0112981 A1* | 4/2020 | Sahlin | H04W 72/14 |
| 2020/0145888 A1* | 5/2020 | Paladugu | H04W 36/0066 |
| 2020/0228285 A1* | 7/2020 | Wang | H04W 72/042 |
| 2020/0245184 A1* | 7/2020 | Jin | H04L 45/74 |
| 2020/0245333 A1* | 7/2020 | Lin | H04L 5/0057 |
| 2020/0305174 A1* | 9/2020 | Ganesan | H04W 4/029 |
| 2020/0314795 A1* | 10/2020 | Wakabayashi | H04W 4/20 |
| 2020/0351026 A1* | 11/2020 | Babaei | H04L 1/1835 |
| 2020/0351682 A1 | 11/2020 | Cirik et al. | |
| 2020/0367311 A1* | 11/2020 | Choi | H04W 76/16 |
| 2021/0014010 A1* | 1/2021 | Babaei | H04L 1/1642 |
| 2021/0022111 A1* | 1/2021 | Kumar | H04W 68/02 |
| 2021/0037484 A1* | 2/2021 | Zhou | H04L 1/1854 |
| 2021/0058955 A1 | 2/2021 | Nam et al. | |
| 2021/0084516 A1 | 3/2021 | Rungta et al. | |
| 2021/0120577 A1 | 4/2021 | Jiang et al. | |
| 2021/0144644 A1* | 5/2021 | Hsieh | H04W 72/0453 |
| 2021/0144742 A1* | 5/2021 | Jeon | H04W 52/50 |
| 2021/0168715 A1* | 6/2021 | Huang | H04W 24/08 |
| 2021/0176013 A1* | 6/2021 | Ali | H04L 1/1861 |
| 2021/0185609 A1* | 6/2021 | Zhou | H04L 69/28 |
| 2021/0195521 A1* | 6/2021 | Müller | H04W 52/0216 |
| 2021/0212103 A1* | 7/2021 | Lin | H04W 72/0453 |
| 2021/0227592 A1* | 7/2021 | Frederiksen | H04W 74/0833 |
| 2021/0250156 A1* | 8/2021 | Kim | H04W 72/0453 |
| 2021/0250899 A1* | 8/2021 | Liu | H04W 68/02 |
| 2021/0258104 A1* | 8/2021 | Ye | H04W 76/11 |
| 2021/0266126 A1* | 8/2021 | Sun | H04L 5/0048 |
| 2021/0298065 A1* | 9/2021 | Awoniyi-Oteri | H04W 72/14 |
| 2021/0298114 A1* | 9/2021 | Nam | H04L 5/001 |
| 2021/0298115 A1* | 9/2021 | Shi | H04W 76/28 |
| 2021/0306044 A1* | 9/2021 | Nam | H04B 7/0626 |
| 2021/0321383 A1* | 10/2021 | Nam | H04L 5/001 |
| 2021/0321442 A1 | 10/2021 | Jung et al. | |
| 2021/0336819 A1* | 10/2021 | Kim | H04L 27/2613 |
| 2021/0344451 A1* | 11/2021 | Hedayat | H04L 1/1861 |
| 2021/0345293 A1* | 11/2021 | Park | H04B 7/08 |
| 2021/0360667 A1 | 11/2021 | Moon et al. | |

(56) References Cited

U.S. PATENT DOCUMENTS

| | | | |
|---|---|---|---|
| 2021/0360732 A1* | 11/2021 | Kim | H04W 24/08 |
| 2021/0368479 A1* | 11/2021 | Yu | H04W 72/02 |
| 2021/0392537 A1* | 12/2021 | Da Silva | H04W 76/25 |
| 2021/0400507 A1* | 12/2021 | You | H04W 52/02 |
| 2021/0410067 A1* | 12/2021 | Miao | H04W 52/0229 |
| 2021/0410098 A1* | 12/2021 | Bao | H04W 52/028 |
| 2022/0030617 A1 | 1/2022 | Nilsson et al. | |
| 2022/0053593 A1* | 2/2022 | Wang | H04W 52/0277 |
| 2022/0104122 A1* | 3/2022 | Maleki | H04W 52/028 |
| 2022/0104124 A1* | 3/2022 | Shah | H04W 72/1278 |
| 2022/0104135 A1* | 3/2022 | Ryu | H04L 1/18 |
| 2022/0104194 A1 | 3/2022 | Yuan et al. | |
| 2022/0104235 A1* | 3/2022 | Wang | H04L 5/0053 |
| 2022/0110059 A1* | 4/2022 | Xue | H04W 52/0229 |
| 2022/0116923 A1* | 4/2022 | Kim | H04L 5/001 |
| 2022/0124622 A1* | 4/2022 | Islam | H04W 52/0232 |
| 2022/0124863 A1* | 4/2022 | Nam | H04W 8/24 |
| 2022/0132420 A1* | 4/2022 | Narasimha | H04W 76/28 |
| 2022/0132426 A1* | 4/2022 | Zhou | H04W 72/042 |
| 2022/0132547 A1* | 4/2022 | Ma | H04L 1/1678 |
| 2022/0141842 A1* | 5/2022 | Kanamarlapudi | H04W 72/14 370/329 |
| 2022/0150831 A1* | 5/2022 | Di Marco | H04W 4/80 |
| 2022/0158774 A1* | 5/2022 | Liu | H04L 1/1671 |
| 2022/0166594 A1* | 5/2022 | Zhang | H04L 5/0092 |
| 2022/0167457 A1* | 5/2022 | Bhatoolaul | H04W 76/27 |
| 2022/0182938 A1* | 6/2022 | Ye | H04W 52/0232 |
| 2022/0182943 A1* | 6/2022 | Maleki | H04W 68/025 |
| 2022/0191721 A1* | 6/2022 | Yi | H04W 24/08 |
| 2022/0191793 A1* | 6/2022 | Murray | H04W 72/044 |
| 2022/0191794 A1* | 6/2022 | Pan | H04W 52/0232 |
| 2022/0201516 A1* | 6/2022 | Guo | H04W 52/0216 |
| 2022/0201522 A1* | 6/2022 | Tao | H04W 68/005 |
| 2022/0217629 A1* | 7/2022 | Gao | H04W 72/23 |
| 2022/0217707 A1* | 7/2022 | Zhou | H04L 5/0096 |
| 2022/0225371 A1* | 7/2022 | Seo | H04W 52/0216 |
| 2022/0225469 A1* | 7/2022 | Lee | H04L 5/0055 |
| 2022/0232478 A1* | 7/2022 | Huang | H04L 5/0053 |
| 2022/0232599 A1* | 7/2022 | Xue | H04W 72/1273 |
| 2022/0232600 A1* | 7/2022 | Kim | H04W 72/1257 |
| 2022/0232667 A1* | 7/2022 | Back | H04W 4/40 |
| 2022/0239417 A1* | 7/2022 | Cheng | H04L 1/1896 |
| 2022/0240284 A1* | 7/2022 | Zhou | H04L 5/0096 |
| 2022/0255708 A1* | 8/2022 | Loehr | H04W 72/0413 |
| 2022/0256458 A1* | 8/2022 | Noh | H04W 52/0229 |
| 2022/0256574 A1 | 8/2022 | Shi et al. | |
| 2022/0256622 A1* | 8/2022 | Li | H04W 52/0229 |
| 2022/0256643 A1* | 8/2022 | Reial | H04W 72/1289 |
| 2022/0264517 A1* | 8/2022 | Liu | H04W 76/32 |
| 2022/0330301 A1 | 10/2022 | Huang | |
| 2022/0353698 A1* | 11/2022 | Jang | H04L 1/189 |
| 2022/0353816 A1 | 11/2022 | Seo et al. | |
| 2022/0361218 A1 | 11/2022 | He et al. | |
| 2022/0416969 A1* | 12/2022 | Lee | H04L 5/0048 |
| 2022/0417909 A1 | 12/2022 | Zhu et al. | |
| 2023/0007589 A1 | 1/2023 | Lin | |
| 2023/0041212 A1 | 2/2023 | Nam et al. | |
| 2023/0097142 A1* | 3/2023 | Alfarhan | H04L 5/0051 370/329 |
| 2023/0155783 A1* | 5/2023 | Liu | H04L 5/0098 370/329 |
| 2023/0189284 A1 | 6/2023 | Cheng et al. | |
| 2023/0209388 A1* | 6/2023 | Hwang | H04W 72/02 370/329 |
| 2023/0276408 A1 | 8/2023 | Zhou et al. | |

FOREIGN PATENT DOCUMENTS

| | | |
|---|---|---|
| WO | WO-2021098053 A1 | 5/2021 |
| WO | WO-2021133705 A1 | 7/2021 |

OTHER PUBLICATIONS

International Search Report and Written Opinion—PCT/US2022/036812—ISA/EPO—dated Oct. 10, 2022.

\* cited by examiner

TECHNIQUES FOR APERIODIC DISCONTINUOUS RECEPTION MODE COMMUNICATIONS

INTRODUCTION

The following relates to wireless communication, and more specifically to managing discontinuous reception (DRX) mode communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include communicating with a device in a wireless network according to a first communication mode, the first communication mode including a periodic DRX mode. In some examples, the method may further include transitioning to a second communication mode based on a transition indication, the second communication mode including an aperiodic DRX mode. In some examples, the method may further include operating according to the second communication mode for a duration of time.

An apparatus for wireless communication at a UE is described. The apparatus may include a processor and memory coupled to the processor. The processor and memory may be configured to communicate with a device in a wireless network according to a first communication mode, the first communication mode including a periodic DRX mode. In some examples, the processor and memory may be further configured to transition to a second communication mode based on a transition indication, the second communication mode including an aperiodic DRX mode. In some examples, the processor and memory may be further configured to operate according to the second communication mode for a duration of time.

Another apparatus for wireless communication at a UE is described. The apparatus may include means for communicating with a device in a wireless network according to a first communication mode, the first communication mode including a periodic DRX mode. In some examples, the apparatus may further include means for transitioning to a second communication mode based on a transition indication, the second communication mode including an aperiodic DRX mode, In some examples, the apparatus may further include means for operating according to the second communication mode for a duration of time.

A non-transitory computer-readable medium storing code for wireless communication at a UE is described. The code may include instructions executable by a processor to communicate with a device in a wireless network according to a first communication mode, the first communication mode including a periodic DRX mode. In some examples, the code may further include instructions executable by the processor to transition to a second communication mode based on a transition indication, the second communication mode including an aperiodic DRX mode. In some examples, the code may further include instructions executable by the processor to operate according to the second communication mode for a duration of time.

In some examples of the method, apparatuses, and non-transitory computer-readable medium described herein, operating according to the second communication mode may include operations, features, means, or instructions for disabling a first set of communication operations for the duration.

In some examples of the method, apparatuses, and non-transitory computer-readable medium described herein, a communication operation of the first set of communication operations includes at least monitoring of a physical downlink control channel (PDCCH), measuring a channel state information-reference signal (CSI-RS), periodic reporting of channel state information (CSI), semi-persistent reporting of the CSI, transmission of a sounding reference signal (SRS), reception of a semi-persistent message, or transmission of a configured grant message, or a combination thereof.

In some examples of the method, apparatuses, and non-transitory computer-readable medium described herein, operating according to the second communication mode may include operations, features, means, or instructions for performing a second set of communication operations during the duration.

In some examples of the method, apparatuses, and non-transitory computer-readable medium described herein, a communication operation of the second set of communication operations includes at least transmission of a scheduling request, aperiodic reporting of CSI, transmission of hybrid automatic repeat request (HARQ) feedback, reception of a physical downlink shared channel (PDSCH) message scheduled prior to transitioning to the second communication mode, transmission of a physical uplink shared channel (PUSCH) message scheduled prior to transitioning to the second communication mode, or discontinuous monitoring of a PDCCH, or a combination thereof.

Some examples of the method, apparatuses, and non-transitory computer-readable medium described herein may further include operations, features, means, or instructions for receiving a control message indicating a first set of communication operations that may be disabled for the duration, a second set of communication operations that may be enabled for the duration, or a combination thereof.

In some examples of the method, apparatuses, and non-transitory computer-readable medium described herein, the control message includes a set of flags, each flag of the set of flags corresponding to a communication operation of the first set of communication operations or the second set of communication operations and indicating whether the communication operation may be disabled or enabled.

Some examples of the method, apparatuses, and non-transitory computer-readable medium described herein may further include operations, features, means, or instructions for receiving a control message including the transition indication, where transitioning to the second communication mode may be based on receiving the control message.

In some examples of the method, apparatuses, and non-transitory computer-readable medium described herein, the control message further includes an indication of a time period for remaining in the second communication mode, the duration corresponding to the time period.

In some examples of the method, apparatuses, and non-transitory computer-readable medium described herein, the indication of the time period includes an index of a set of indexes corresponding to a set of time periods for remaining in the second communication mode, the index corresponding to the time period, the set of time periods including the time period.

In some examples of the method, apparatuses, and non-transitory computer-readable medium described herein, the control message includes a PDCCH message, a medium access control (MAC)-control element (MAC-CE) message, or a combination thereof.

In some examples of the method, apparatuses, and non-transitory computer-readable medium described herein, the transition indication includes a timer associated with traffic inactivity between the UE and the device, the transitioning to the second communication mode based on an expiration of the timer.

Some examples of the method, apparatuses, and non-transitory computer-readable medium described herein may further include operations, features, means, or instructions for transmitting a capability message that indicates a delay associated with transitioning between the first communication mode and the second communication mode, where operating according to the second communication mode may be based on the delay.

Some examples of the method, apparatuses, and non-transitory computer-readable medium described herein may further include operations, features, means, or instructions for skipping monitoring of a physical downlink shared channel occasion that occurs during the duration based on operating according to the second communication mode. Some examples of the method, apparatuses, and non-transitory computer-readable medium described herein may further include operations, features, means, or instructions for transitioning from the second communication mode to the first communication mode based on an expiration of the duration. Some examples of the method, apparatuses, and non-transitory computer-readable medium described herein may further include operations, features, means, or instructions for transmitting, to the device, a feedback message that excludes acknowledgement information associated with the skipped physical downlink shared channel occasion based on operating according to the second communication mode during the physical downlink shared channel occasion.

Some examples of the method, apparatuses, and non-transitory computer-readable medium described herein may further include operations, features, means, or instructions for skipping monitoring of a physical downlink shared channel occasion that occurs during the duration based on operating according to the second communication mode. Some examples of the method, apparatuses, and non-transitory computer-readable medium described herein may further include operations, features, means, or instructions for transitioning from the second communication mode to the first communication mode based on an expiration of the duration. Some examples of the method, apparatuses, and non-transitory computer-readable medium described herein may further include operations, features, means, or instructions for transmitting, to the device, a feedback message that includes acknowledgement information associated with the skipped physical downlink shared channel occasion.

Some examples of the method, apparatuses, and non-transitory computer-readable medium described herein may further include operations, features, means, or instructions for disabling one or more timers associated with the periodic DRX mode for the duration based on operating according to the second communication mode.

In some examples of the method, apparatuses, and non-transitory computer-readable medium described herein, the second communication mode may be associated with a first set of component carriers of a carrier group, a second set of component carriers of a DRX group, or a combination thereof.

A method for wireless communication at a device in a wireless network is described. The method may include communicating with a UE according to a first communication mode, the first communication mode including a periodic DRX mode. In some examples, the method may further include communicating with the UE according to a second communication mode for a duration based on a transition indication, the second communication mode including an aperiodic DRX mode.

An apparatus for wireless communication at a device in a wireless network is described. The apparatus may include a processor and memory coupled to the processor. The processor and memory may be configured to communicate with a UE according to a first communication mode, the first communication mode including a periodic DRX mode. In some examples, the processor and memory may be further configured to communicate with the UE according to a second communication mode for a duration based on a transition indication, the second communication mode including an aperiodic DRX mode.

Another apparatus for wireless communication at a device in a wireless network is described. The apparatus may include means for communicating with a UE according to a first communication mode, the first communication mode including a periodic DRX mode. In some examples, the apparatus may further include means for communicating with the UE according to a second communication mode for a duration based on a transition indication, the second communication mode including an aperiodic DRX mode.

A non-transitory computer-readable medium storing code for wireless communication at a device in a wireless network is described. The code may include instructions executable by a processor to communicate with a UE according to a first communication mode, the first communication mode including a periodic DRX mode. In some examples, the code may further include instructions executable by the processor to communicate with the UE according to a second communication mode for a duration based on a transition indication, the second communication mode including an aperiodic DRX mode.

In some examples of the method, apparatuses, and non-transitory computer-readable medium described herein, the transition indication indicates for the UE to disable a first set of communication operations for the duration.

Some examples of the method, apparatuses, and non-transitory computer-readable medium described herein may further include operations, features, means, or instructions for performing a second set of communication operations during the duration based on communicating with the UE according to the second communication mode, where a communication operation of the second set of communication operations includes at least reception of a scheduling request, reception of an aperiodic-CSI (A-CSI) report, reception of HARQ feedback, transmission of a PDSCH message scheduled prior to transitioning to the second communication mode, reception of a PUSCH message scheduled prior to transitioning to the second communication mode, transmission of a discontinuous PDCCH message, or a combination thereof.

Some examples of the method, apparatuses, and non-transitory computer-readable medium described herein may further include operations, features, means, or instructions for transmitting, to the UE, a control message indicating a first set of communication operations that may be disabled for the duration, a second set of communication operations that may be enabled for the duration, or a combination thereof.

In some examples of the method, apparatuses, and non-transitory computer-readable medium described herein, the control message includes a set of flags, each flag of the set of flags corresponding to a communication operation of the first set of communication operations or the second set of communication operations and indicating whether the communication operation may be disabled or enabled.

Some examples of the method, apparatuses, and non-transitory computer-readable medium described herein may further include operations, features, means, or instructions for transmitting a control message including the transition indication, where communicating with the UE according to the second communication mode may be based on transmitting the control message.

In some examples of the method, apparatuses, and non-transitory computer-readable medium described herein, the control message further includes an indication of a time period for remaining in the second communication mode, the duration corresponding to the time period.

In some examples of the method, apparatuses, and non-transitory computer-readable medium described herein, the indication of the time period includes an index of a set of indexes corresponding to a set of time periods for remaining in the second communication mode, the index corresponding to the time period, the set of time periods including the time period.

In some examples of the method, apparatuses, and non-transitory computer-readable medium described herein, the transition indication includes a timer associated with traffic inactivity between the device and the UE, the communicating with the UE according to the second communication mode based on an expiration of the timer.

Some examples of the method, apparatuses, and non-transitory computer-readable medium described herein may further include operations, features, means, or instructions for receiving, from the UE, a capability message that indicates a delay associated with transitioning between the first communication mode and the second communication mode, where communicating with the UE according to the second communication mode may be based on the delay.

Some examples of the method, apparatuses, and non-transitory computer-readable medium described herein may further include operations, features, means, or instructions for disabling one or more timers associated with the periodic DRX mode for the duration based on communicating with the UE according to the second communication mode.

DETAILED DESCRIPTION

Figure 1:
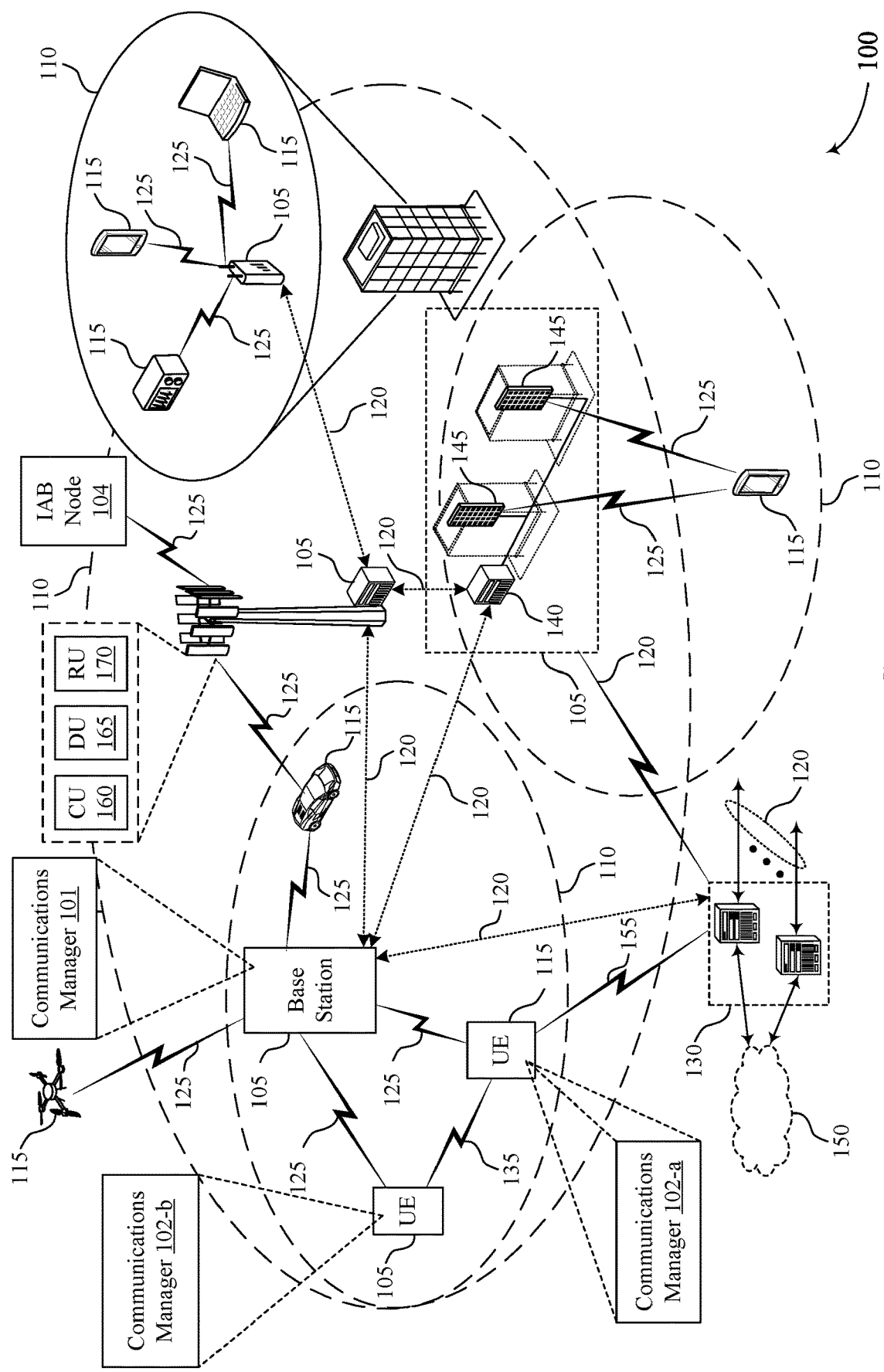
FIGS. 1 and 2A illustrate examples of wireless communications systems that supports techniques for aperiodic DRX mode communications in accordance with one or more aspects of the present disclosure.

Some wireless communications systems may include communication devices, such as a UE and a base station (e.g., an eNodeB (eNB), a next-generation NodeB or a giga-NodeB, either of which may be referred to as a gNB, or some other base station), that may support multiple radio access technologies (RATs). Examples of RATs include 4G systems, such as LTE systems, and 5G systems, which may be referred to as NR systems. In some aspects, a UE may continuously monitor communication links for an indication that the UE may receive data. In some other aspects, a UE may be configured to operate according to a DRX mode (e.g., cycle). A DRX cycle consists of an "On period" during which the UE monitors for control information (e.g., during a control channel occasion, such as a PDCCH occasion) and an "Off period" when the UE enters a power saving state (e.g., power down one or more radio components) to conserve power and extend battery life. In some aspects, the UE may receive control information during a control channel occasion that schedules one or more downlink (e.g., data) transmissions. When this occurs, the UE may exit or refrain from entering the power saving state to receive the one or more downlink transmissions (e.g., and transmit one or more uplink transmissions) and may subsequently enter (e.g., re-enter) the power saving state.

In some aspects, power consumption may be further reduced via PDCCH skipping. A base station may transmit an indication to a UE to skip the monitoring of one or more PDCCH occasions. In response, the UE may enter or refrain from exiting a power saving state and skip the monitoring of the one or more PDCCH occasions (e.g., and communication of any corresponding downlink/uplink transmissions), thereby further reducing power consumption by being in a power saving state for a longer period of time. In some cases, however, PDCCH skipping may be associated with a particular component carrier (e.g., of a carrier group that includes multiple component carriers associated with a base station, of a DRX group, which may be a set of one or more component carriers configured for a UE and that are configured with one or more DRX parameters such as cycle length, On period duration, Off period duration, timer durations, or other DRX parameters), and a UE may be configured to communicate over multiple component carriers using at least some same radio components. Accordingly, if the UE is configured to skip control channel monitoring for a duration in a component carrier but is also configured to monitor control channel occasions in one or more other component carriers during the duration, the UE may power on radio components to monitor the control channel occasions in the other component carriers, thus affecting the power saving gains associated with PDCCH skipping. Additionally, the UE may be configured to perform periodic communication operations and/or semi-persistent communication operations (e.g., communication operations using a configured resource allocation that is activated for a period of time by a base station) during the duration to skip the control channel monitoring in the component carrier and may power on one or more radio components (e.g., exit a power saving state) to perform the periodic communication operations and/or semi-persistent communication operations, thereby affecting the power saving gains associated with PDCCH skipping.

Techniques, systems, and devices are described herein for reducing power consumption and processing by supporting operations in accordance with an aperiodic DRX mode. For example, a UE may communicate with a communication device (e.g., a base station, another UE) according to a periodic DRX mode. The UE may operate according to a DRX cycle consisting of a periodic On period and Off period. For example, the UE may be configured to use one or more periodic timers (e.g., a drx-onDurationTimer) to determine when to monitor for control information in a control channel occasion. To reduce power consumption and processing at the UE, the UE may be dynamically indicated to transition from the periodic DRX mode to an aperiodic DRX mode. The aperiodic DRX mode may be a DRX mode to which the UE may dynamically transition (e.g., at any time during a periodic DRX cycle) for a duration before transitioning back to periodic DRX mode operation. Additionally, the DRX mode may be a DRX mode in which a first set of communication operations may be disabled and, in some examples, a second set of communication operations may be enabled (e.g., across component carriers of a carrier group or a DRX group). In some examples, the communication device may transmit a control message (e.g., via a PDCCH, via a MAC-CE that indicates for the UE to transition to the aperiodic DRX mode (e.g., for a duration of time). Alternatively, the UE may transition to the aperiodic DRX mode based on detecting traffic inactivity between the UE and the communication device (e.g., in response to an expiration of a traffic inactivity timer).

During aperiodic DRX mode operation, the UE may be configured to disable the first set of communication operations (e.g., across component carriers of a carrier group or a DRX group). For example, the UE may be configured to disable any combination of PDCCH monitoring, periodic CSI reporting, semi-persistent CSI reporting CSI-RS measurement(s), SRS transmissions, semi-persistent message reception, and configured grant transmissions, among other communication operations. As a result, the UE may enter a power saving state, thereby reducing power consumption and processing at the UE during aperiodic DRX mode operation. Additionally, or alternatively, a second set of communication operations may be enabled during aperiodic DRX mode operation. For example, during aperiodic DRX mode operation, the UE may be configured to perform any combination of scheduling request transmissions, A-CSI reporting, HARQ feedback transmissions, reception of prior scheduled PDSCH messages, transmission of prior scheduled PUSCH messages, and discontinuous PDCCH monitoring, among other communication operations. Here, the UE may exit the power saving state to perform one or more communication operations of the second set and may otherwise remain in the power saving state.

In some aspects, aperiodic DRX mode operation may reduce power consumption, increase battery life, and reduce processing associated with DRX communications. In some other aspects, aperiodic DRX mode operation may increase spectral efficiency, resource usage utilization, data rates, and coordination between devices.

Aspects of the disclosure are initially described in the context of wireless communications systems. Aspects of the disclosure are additionally described in the context of a communication sequence and a process flow. Aspects of the disclosure are further illustrated by and described with reference to apparatus diagrams, system diagrams, and flowcharts that relate to techniques for aperiodic DRX mode communications.

FIG. 1 illustrates an example of a wireless communications system 100 that supports techniques for aperiodic DRX mode communications in accordance with one or more aspects of the present disclosure. The wireless communications system 100 may include one or more base stations 105, one or more UEs 115, and a core network 130. In some aspects, the wireless communications system 100 may be an LTE network, an LTE-A network, an LTE-A Pro network, or an NR network. In some aspects, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some aspect UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to operate according to an aperiodic DRX mode described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. A UE 115 may communicate with the core network 130 through a communication link 155.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some aspects (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some aspects the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some aspects, the wireless communications system 100 may include base stations 105 or UEs 115 that support simultaneous communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other aspects, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

Some UEs 115 may be configured to employ operating modes that reduce power consumption, such as half-duplex communications (e.g., a mode that supports one-way communication via transmission or reception, but not transmission and reception simultaneously). In some aspects, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105. In some aspects, a D2D communication link 135 may referred to as a sidelink which may facilitate communications between one or more UEs 115.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some aspects, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to an aperiodic DRX mode described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to operate according to an aperiodic DRX mode described herein.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may transmit a sounding reference signal (SRS) using a predetermined sequence (e.g., a Zadoff-Chu sequence) so that a base station 105 may estimate uplink channel quality and/or downlink channel quality. In some aspects, an SRS may be scheduled on multiple antenna ports and still considered to be a single SRS transmission. An SRS transmission may be categorized as a Type 0 (periodically transmitted at equally spaced intervals) SRS or as a Type 1 (aperiodic) SRS. In either case, the base station 105 may control the timing of SRS transmissions by notifying (e.g., via an SRS configuration message) the UE 115 of which TTIs (e.g., subframes) may support the transmission of the SRS. Additionally, a sounding period (e.g., 2 to 230 subframes) and an offset within the sounding period may be configured for the UE 115. As a result, the UE 115 may transmit the SRS when a subframe that supports SRS transmissions coincides with the configured sounding period. In some cases, SRSs may be transmitted during particular symbols of the subframe (e.g., during one or more of the six temporally last OFDM symbol of the subframe) or, in some cases, may be sent during an uplink portion of a special subframe. Data gathered by a base station 105 from an SRS may be used to inform the scheduling of uplink transmissions by the UE 115, such as frequency dependent transmissions. A base station 105 may also utilize an SRS to check timing alignment status and send time alignment commands to the UE 115.

A base station 105 may gather channel condition information from a UE 115 to efficiently configure schedule the channel. This information may be sent from the UE 115 in the form of a channel state report (or CSI report). A channel state report may contain a rank indicator (RI) requesting a number of layers to be used for downlink transmissions (e.g., based on antenna ports of the UE 115), a PMI indicating a preference for which precoder matrix should be used (e.g., based on a number of layers), and a channel quality indicator (CQI) representing a highest modulation and coding scheme (MCS) that may be used. In some cases, the RI may be associated with a number of antennas used by a device. CQI may be calculated by a UE 115 after receiving predetermined pilot symbols such as CRS or CSI-RS. RI and PMI may be excluded if the UE 115 does not support spatial multiplexing (or is not in a supported spatial mode). In some aspects, the types of information included in the CSI report determines a reporting type. Channel state reports may be periodic or aperiodic. Further, channel state reports may have different types based on a codebook used to generate the report. For instance, a Type I CSI report may be based on a first codebook and a Type II CSI report may be based on a second codebook, where the first and second codebooks may be based on different antenna configurations. In some cases, the use of either Type I or Type II CSI reports may improve MIMO performance (as compared to other types of CSI reports). In some cases, a Type II CSI report may be carried at least on a PUSCH, and may provide CSI to a base station 105 with a relatively higher level of granularity (e.g., for multiple-user MIMO (MU-MIMO) services).

The wireless communications system 100 may support semi-persistent scheduling (SPS) resource allocation schemes in order to, for example, reduce control signaling overhead. For example, a base station 105 may dynamically allocate resources to a UE 115 (e.g., for a subframe) by transmitting a resource grant to the UE 115 in a PDCCH. To reduce signaling overhead associated with dynamically allocating resources to a UE 115, the base station 105 may configure a UE 115 (e.g., via RRC signaling) with an SPS resource allocation according to a periodicity (e.g., every 10 ms, every 20 ms, every subframe, every other subframe, or some other periodicity). The base station 105 may activate the SPS resource allocation (e.g., for the transmission of one or more SPS messages) by transmitting a control message in a PDCCH that indicates the activation of the SPS resource allocation. The SPS resource allocation may remain activated (e.g., the UE 115 may use the SPS resources in accordance with the periodicity) until the base station 105 transmits an indication (e.g., via a PDCCH) to deactivate the SPS resource allocation. Thus, the base station 105 may allocate multiple sets of resources to a UE 115 via a single PDCCH message, thus reducing signaling overhead.

In some cases, a UE 115 may monitor a communication link 125 continuously for an indication that the UE 115 may receive data. In other cases (e.g., to conserve power and extend battery life) a UE 115 may be configured with a periodic DRX cycle. A periodic DRX cycle consists of an "On Duration" when the UE 115 may monitor for control information on a PDCCH (e.g., for the duration of a drx-onDurationTimer) and an "Off Duration" when the UE 115 may power down radio components (e.g., enter a power saving state). In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle, and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer" (e.g., a drx-InactivityTimer). If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

The wireless communications system 100 may be configured to support communicating in accordance with periodic DRX modes and aperiodic DRX modes. For example, base stations 105 may include a communications manager 101 and UEs 115 may include a communications manager 102 that may support operating in accordance with an aperiodic DRX mode. For instance, a base station 105 may include a communications manager 101, a first UE 115 may include a communications manager 102-a, and a second UE 115 may include a communications manager 102-b. The communications manager 101 and the communications manager 102-b may be examples of aspects of a communications manager as described in FIGS. 9 through 12. The communications manager 102-a may be examples of aspects of a communications manager as described in FIGS. 5 through 8.

By way of example, the first UE 115 (e.g., using the communications manager 102-a) may communicate with a communication device (e.g., the base station 105 using the communications manager 101, the second UE 115 using the communications manager 102-b) according to a periodic DRX mode. To reduce power consumption and processing, the first UE 115 may be dynamically indicated to transition from the periodic DRX mode to an aperiodic DRX mode in which a first set of communication operations may be disabled. For example, the communication device may transmit a control message (e.g., via a PDCCH, via a MAC-CE) that indicates for the first UE 115 to transition to the aperiodic DRX mode (e.g., for a duration of time). Alternatively, the first UE 115 may transition to the aperiodic DRX mode based on detecting traffic inactivity between the first UE 115 and the communication device (e.g., in response to an expiration of a traffic inactivity timer).

During aperiodic DRX mode operation, the first UE 115 may be configured to disable the first set of communication operations (e.g., across component carriers of carrier group or DRX group). For example, the first UE 115 may be configured to disable any combination of PDCCH monitoring, periodic CSI reporting, semi-persistent CSI reporting, CSI-RS measurement(s), and SRS transmissions, semi-persistent message reception, and configured grant transmissions, among other communication operations, and may enter a power saving state. Additionally, or alternatively, a second set of communication operations may be enabled during aperiodic DRX mode operation. For example, during aperiodic DRX mode operation, the first UE 115 may be configured to perform any combination of scheduling request transmissions, A-CSI reporting, HARQ feedback transmissions, reception of prior scheduled PDSCH messages, transmission of prior scheduled PUSCH messages, and discontinuous PDCCH monitoring, among other communication operations. Here, the first UE 115 may exit the power saving state to perform one or more communication operations of the second set of communication operations and may otherwise remain in the power saving state.

Figure 2A:
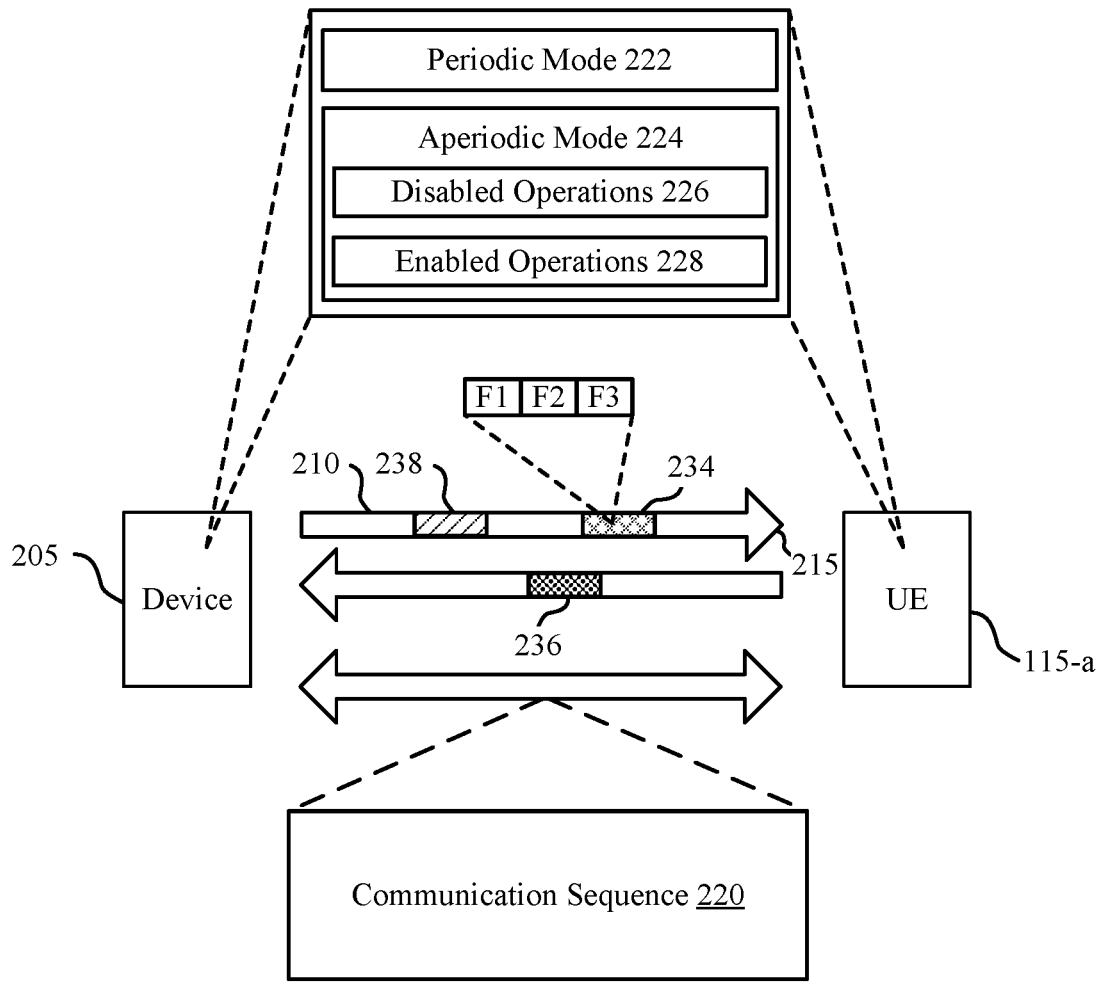
Figure 2B:
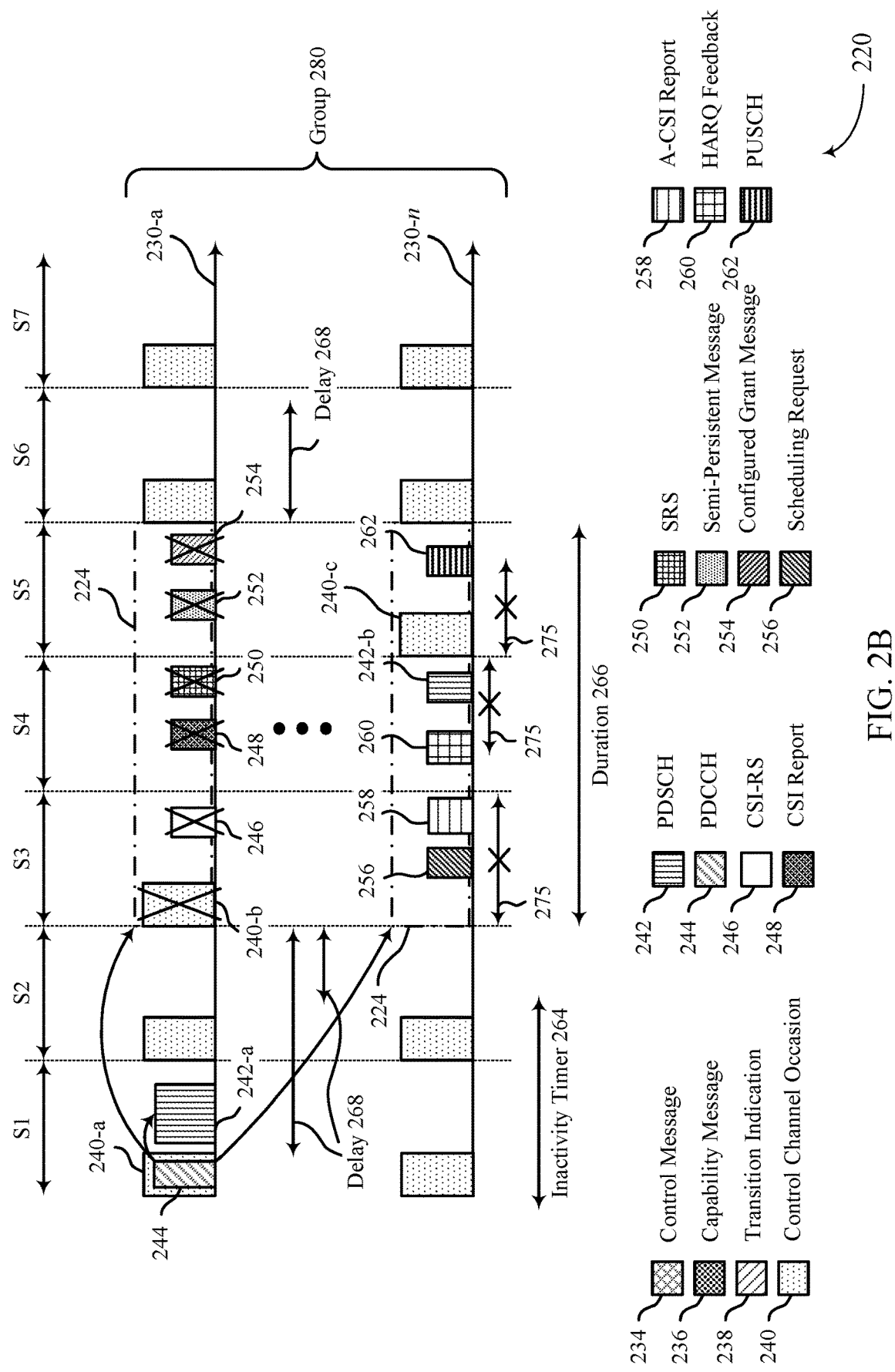
FIGS. 2B and 3 illustrate examples of communication sequences that support techniques for aperiodic DRX mode communications in accordance with one or more aspects of the present disclosure.

FIGS. 2A and 2B illustrate examples of a wireless communications system 200 and a communication sequence 220 that support techniques for aperiodic DRX mode communications in accordance with one or more aspects of the present disclosure. The wireless communications system 200 may implement aspects of the wireless communications system 100 or may be implemented by aspects of the wireless communications system 100. For example, the wireless communications system 200 may include a UE 115-a which may be an example of a UE 115 described with reference to FIG. 1. Additionally, the wireless communications system 200 may include a device 205, which may be an example of a base station 105 or a UE 115 described with reference to FIG. 1. In some aspects, the wireless communications system 200 may support multiple RATs including 4G systems and 5G systems which may be referred to as NR systems. The wireless communications system 200 may support an aperiodic DRX mode to reduce power consumption, increase batter life, reduce processing, increase coordination between devices, increase spectral efficiency, and increase data rates.

The wireless communications system 200 may support communications between the UE 115-a and the device 205. For example, the UE 115-a may transmit uplink messages (e.g., or sidelink messages) to the device 205 on a communication link 215 (e.g., which may be an example of a communication link 125 or a D2D communication link 135) and may receive downlink messages (e.g., or sidelink messages) on a communication link 210 (which may be an example of a communication link 125 or a D2D communication link 135).

The UE 115-a and the device 205 may support DRX mode operations to conserve power and extend battery life. For example, the UE 115-a and the device 205 may support communicating according to a periodic mode 222, which may be a periodic DRX mode that enables the UE 115-a (e.g., the device 205) to enter a power saving state in which one or more radio components are power down. Additionally, in order to further increase power saving and battery life gains associated with DRX mode operations, the UE 115-a and the device 205 may support an aperiodic mode 224, which may be an aperiodic DRX mode. The aperiodic mode 224 may enable the UE 115-a (e.g., and the device 205) to dynamically (e.g., aperiodically, at any time during a periodic DRX cycle associated with the periodic mode 222) disable one or more communication operations, thereby increasing an amount of time spent in the power saving state.

To support operating according to the aperiodic mode 224, the wireless communications system 200 may support communications between the device 205 and the UE 115-a in accordance with the communication sequence 220. For example, the communication sequence 220 depicts communications between the device 205 and the UE 115-a over a quantity of slots S (e.g., over slots S1, S2, S3, S4, S5, S6, and S7, although other time intervals or slot quantities are possible). Additionally, the communication sequence depicts communications between the device 205 and the UE 115-a over a quantity of component carriers 230 (e.g., over component carrier 230-a through component carrier 230-n). In some aspects, the component carriers 230 may be associated with (e.g., included in) a group 280, which may correspond to a carrier group or a DRX group. For example, the group 280 may be a carrier group in which each of the component carriers 230 are used to communicate with a base station 105 (e.g., the device 205). Alternatively, the group 280 may be a DRX group in which each of the component carriers 230 are used to communicate according to a same set of DRX parameters (e.g., cycle length, On period duration, Off period duration, periodic timer durations, among other DRX parameters). The communication sequence 220 may depict various examples of the device 205 and the UE 115-a transitioning between the periodic mode 222 and the aperiodic mode 224 and communicating in accordance with the respective modes.

In a first example, the communication sequence 220 may depict transitioning to the aperiodic mode 224 based on an explicit indication to transition to the aperiodic mode 224. For example, during operation according to the periodic mode 222, the UE 115-a may be configured to monitor for control information during (e.g., periodically) configured control channel occasions 240 (e.g., every slot S). Accordingly, the UE 115-a may exit (e.g., or refrain from entering) a power saving state during the configured control channel occasions 240 to monitor for potentially transmitted control information (e.g., by the device 205). In some aspects, the UE 115-a may monitor a control channel occasion 240-a in a component carrier 230-a and may detect, based on the monitoring, a transmission of a PDCCH 244 which may indicate for the UE 115-a to transition to the aperiodic mode 224. For example, the device 205 may transmit a transition indication 238 via the PDCCH 244 that triggers the UE 115-a (e.g., and the device 205 based on transmitting the transition indication 238) to transition to the aperiodic mode 224. In some aspects, the PDCCH 244 may additionally schedule transmissions of one or more PDSCHs 242 (e.g., a PDSCH 242-a). In some aspects, the device 205 may transmit the transition indication 238 via a MAC-CE.

In a second example, the communication sequence 220 may depict transitioning to the aperiodic mode 224 based on an implicit indication to transition to the aperiodic mode 224. For example, the UE 115-a (e.g., and the device 205) may transition to the aperiodic mode 224 based on detecting traffic inactivity between the UE 115-a and the device 205. For instance, the UE 115-a may monitor for control information from the device 205 in control channel occasions 240 in component carriers 230-a through 230-n. The UE 115-a (e.g., and the device 205) may initiate an inactivity timer 264 (e.g., at or before slot S1) that continues to run as long as control information is undetected by the UE 115-a. Here, the device 205 may not transmit the transition indication 238 via the PDCCH 244 (e.g., or a MAC-CE), and thus the UE 115-a may not detect (e.g., receive) control information in the control channel occasion 240-a (e.g., and other control channel occasions 240 during which the inactivity timer 264 runs). An expiration of the inactivity timer 264 may trigger the UE 115-a (e.g., and the device 205) to transition to the aperiodic mode 224. For example, the UE 115-a may transition to the aperiodic mode 224 in response to detecting the expiration of the inactivity timer 264. In some aspects, a duration of the inactivity timer 264 may be configured by a network (e.g., a core network 130 via a base station 105).

In some aspects, a delay 268 may be associated with transitioning between the aperiodic mode 224 and the periodic mode 222. For example, the UE 115-a (e.g., and the device 205) may be configured to (e.g., capable of) transition between the periodic mode 222 and the aperiodic mode 224 some duration of time after being triggered to transition to the aperiodic mode 224 (e.g., based on receiving the transition indication 238, based on the expiration of the inactivity timer 264) or to the periodic mode 222 (e.g., based on an expiration of a duration 266 associated with the aperiodic mode 224), where the duration of time corresponds to the delay 268. In some aspects, the UE 115-a may transmit a capability message 236 to the device 205 (e.g., prior to the communication sequence 220, prior to periodic mode 222 operation, during configuration of periodic mode 222 and aperiodic mode 224 operation) that indicates the delay 268, and the UE 115-a (e.g., and the device 205) may transition between the periodic mode 222 and aperiodic mode 224 based on the capability message 236.

During operation in the aperiodic mode 224, the UE 115-a may be configured to disable a first set of communication operations with the device 205. For example, the device 205 may configure the UE 115-a with a set of disabled operations 226 associated with the aperiodic mode 224, which may correspond to an expected behavior of communication between the UE 115-a and the device 205 during operation in the aperiodic mode 224. That is, the UE 115-a and the device 205 may expect that the communication operations included in the disabled operations 226 may be disabled, delayed, or unexecuted while the UE 115-a and the device 205 operate according to the aperiodic mode 224. In some aspects, the UE 115-a may disable the disabled operations 226 across the component carriers 230 (although, for clarity, FIG. 2 depicts the disabled operations 226 as being disabled over component carrier 230-a). As a result, the UE 115-a may be able to be in a power saving state without exiting the power saving state to perform one or more of the disabled operations 226 on a particular component carrier 230.

The disabled operations 226 may include communication operations that, when disabled, may enable the UE 115-a to be in a power saving state for a relatively longer period of time (e.g., compared to operating in the periodic mode 222). For example, the UE 115-a may be configured to disable, during aperiodic mode 224 operation, PDCCH monitoring (e.g., monitoring of the control channel occasion 240-b and other control channel occasions 240 that occur while operating in the aperiodic mode 224), measuring of a CSI-RS 246, periodic transmission of a CSI report 248, semi-persistent transmission of the CSI report 248, transmission of an SRS 250, reception of a semi-persistent message 252, transmission of a configured grant message 254 (e.g., a message in response to a resource grant received from the device 205), or any combination thereof. Additionally, or alternatively, the device 205 may be configured to disable, during aperiodic mode 224 operation, transmission of a PDCCH 244, transmission of a CSI-RS 246, reception of a periodic CSI report 248, reception of a semi-persistent CSI report 248, reception of an SRS 250, transmission of a semi-persistent message 252, reception of a configured grant message 254, or any combination thereof.

The UE 115-a may additionally be configured to allow (e.g., and perform) a second set of communication operations with the device 205 during operation in the aperiodic mode 224. For example, the device 205 may configure the UE 115-a with a set of enabled operations 228 associated with the aperiodic mode 224, which may correspond to an expected behavior of communication between the UE 115-a and the device 205 during operation in the aperiodic mode 224. That is, the UE 115-a and the device 205 may expect that the communication operations included in the enabled operations 228 may be enabled or performed (e.g., if scheduled) while the UE 115-a and the device 205 operate according to the aperiodic mode 224. In some aspects, the UE 115-a may perform the enabled operations 228 across the component carriers 230 (although, for clarity, FIG. 2 depicts the enabled operations 228 as being performed over component carrier 230-n).

Based on being configured with the set of enabled operations 228, the UE 115-a may perform, during aperiodic mode 224 operation, transmission of a scheduling request 256 (e.g., that requests an allocation of resources from the device 205), transmission of an A-CSI report 258, transmission of HARQ feedback 260, reception of a PDSCH 242-b that was scheduled prior to initiation of (e.g., the transition to) the aperiodic mode 224, transmission of a PUSCH 262 that was scheduled prior to the initiation of the aperiodic mode 224, discontinuous PDCCH monitoring (e.g., discontinuous monitoring of a control channel occasion 240-c), or any combination thereof. In some aspects, the discontinuous PDCCH monitoring may occur based on a round trip timer, a retransmission timer, or both, associated with the control channel occasion 240-c. Additionally, or alternatively, the device 205 may be configured to perform, during aperiodic mode 224 operation, reception of the scheduling request 256, reception of the A-CSI report 258, reception of HARQ feedback 260, transmission of the PDSCH 242-b, reception of the PUSCH 262, transmission of a discontinuous PDCCH (e.g., during the control channel occasion 240-c), or any combination thereof.

In some aspects, each disabled operation and enabled operation may be individually configured. For example, the UE 115-a may be configured to disable the disabled operations 226 and allow the enabled operations 228 based on a control message 234 transmitted by the device 205 (e.g., prior to the communication sequence 220). The control message 234 may indicate which communication operations are disabled and which communication operations are enabled during aperiodic mode 224 operation. To support such indications, the control message 234 may include a set of configuration flags F that each indicate whether a particular communication operation is disabled or enabled. For example, the control message 234 may include configuration flags F1, F2, and F3, where configuration flag F1 corresponds to a first communication operation, configuration flag F2 corresponds to a second communication operation, and configuration flag F3 corresponds to a third communication operation. In some aspects, a bit value of a respective configuration flag F may indicate whether the corresponding communication operation is enabled. For example, a bit value of a '1' may indicate that the corresponding communication operation is enabled, and a bit value of a '0' may indicate that the corresponding communication operation is disabled (e.g., or vice versa). Accordingly, the UE 115-a may determine the set of disabled operations 226 and the set of enabled operations 228 based on the set of configuration flags F included in the control message 234.

The UE 115-a (e.g., and the device 205) may be configured to operate in the aperiodic mode 224 for a duration 266 before transitioning to the periodic mode 222. For example, the transition indication 238 may include an indication of a time period for remaining in the aperiodic mode 224, where the duration 266 corresponds to the time period. In some aspects, the time period may be a duration of a timer that is initiated at the start of the aperiodic mode 224 operation. In some cases, the transition indication 238 may indicate the time period from a set of time periods. For example, the transition indication 238 may include an index of a set of indexes corresponding to the set of time periods for remaining in the aperiodic mode 224, where the index corresponds to the time period. Additionally, or alternatively, the duration 266 may be configured, for example, during configuration of the aperiodic mode 224. For example, the control message 234 may include an indication of the duration 266, and the UE 115-a (e.g., and the device 205) may remain in the aperiodic mode 224 for the duration 266 based on the control message 234. In some aspects, the duration 266 may correspond to a quantity of slots S (e.g., three slots S from slots S3 to S5, or some other quantity of slots S) or to a quantity of milliseconds, or some other quantity of time. Upon expiration of the duration 266, the UE 115-a (e.g., and the device 205) may transition from the aperiodic mode 224 to the periodic mode 222 (e.g., and operate according to the periodic mode 222 after a delay 268).

In some aspects, the UE 115-a (e.g., and the device 205) may suspend or disable one or more timers, such as periodic timers 275 associated with periodic DRX mode operation (e.g., periodic mode 222) for the duration 266. For example, the UE 115-a (e.g., and the device 205) may disable a drx-onDurationTimer and a drx-Inactivity Timer associated with periodic DRX mode operation, among other periodic timers 275 associated with periodic DRX mode operation. Accordingly, the UE 115-a (e.g., and the device 205) may refrain from performing operations associated with an expiration of the one or more periodic timers 275 while operating in the aperiodic mode 224.

Figure 3:
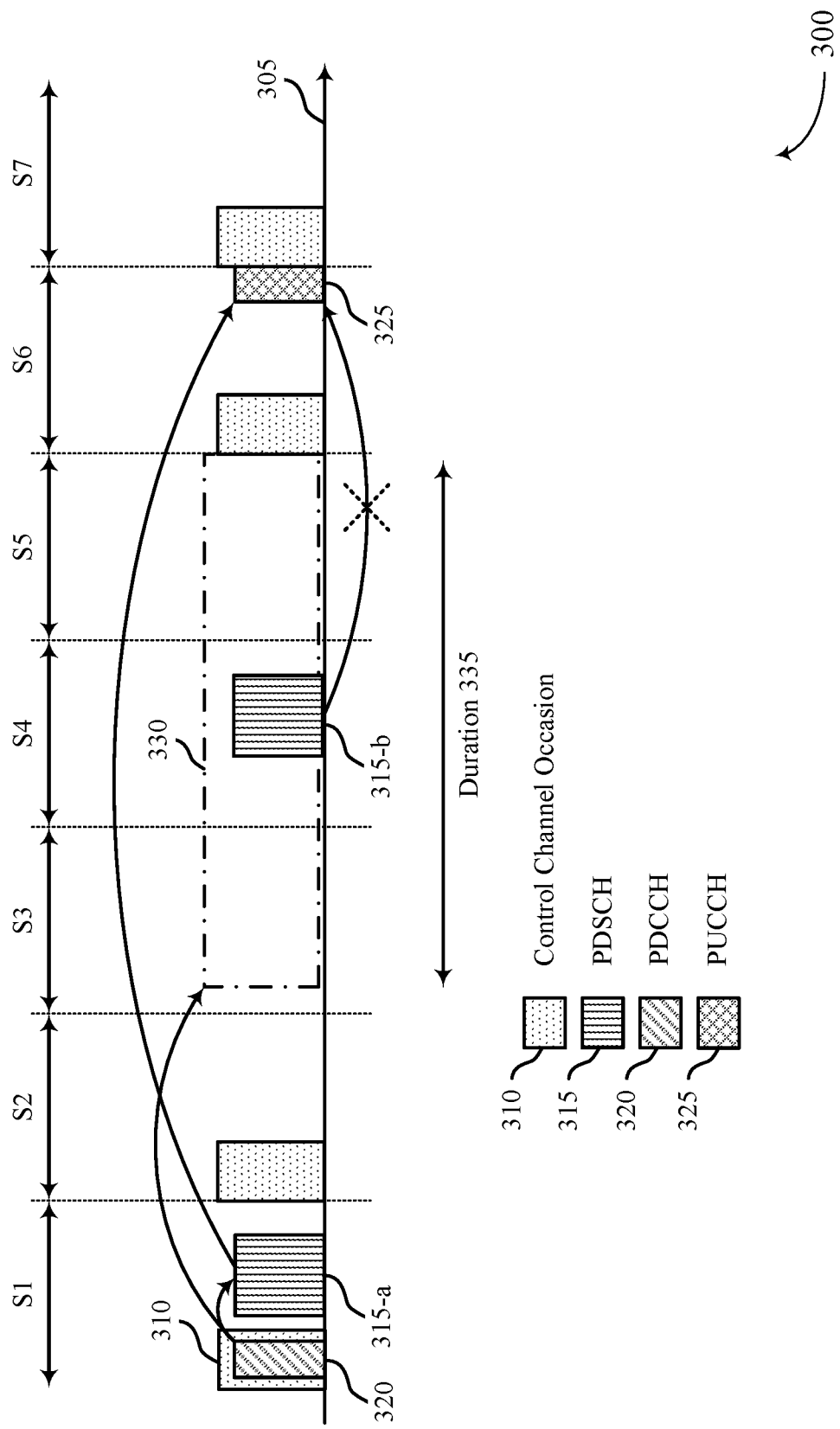

FIG. 3 illustrates an example of a communication sequence 300 that supports techniques for aperiodic DRX mode communications in accordance with one or more aspects of the present disclosure. The communication sequence 300 may implement aspects of the wireless communications systems 100 and 200 or may be implemented by aspects of the wireless communications system 100 and 200 as described with reference to FIGS. 1 and 2, respectively. For example, the communication sequence 300 may be implemented by a UE 115 and a device 205 to manage HARQ feedback associated with aperiodic DRX mode operation.

The communication sequence 300 depicts communications between the UE 115 and the device 205 over a quantity of slots S (e.g., over slots S1, S2, S3, S4, S5, S6, and S7, although other time intervals or slot quantities are possible) and over a component carrier 305. In some aspects, the UE 115 may monitor a control channel occasion 310 and receive a PDCCH 320 from the device 205 during the control channel occasion 310 that indicates for the UE 115 (e.g., and the device 205) to transition to the aperiodic mode 330 (e.g., from a periodic DRX mode). The PDCCH 320 may also schedule the transmission of a PDSCH 315-*a* to the UE 115 during the slot S1.

In response to being triggered to transition to the aperiodic mode 330 (e.g., based on the PDCCH 320, based on the expiration of an inactivity timer), the UE 115 (e.g., and the device 205) may transition to the aperiodic mode 330 and may operate according to the aperiodic mode 330 for a duration 335. For example, the UE 115 (e.g., and the device 205) may disable a first set of communication operations and allow (e.g., perform) a second set of communication operations while operating in the aperiodic mode 330.

The communication sequence 300 depicts various examples of managing HARQ feedback associated with operating in the aperiodic mode 330. For example, as a result of operating in the aperiodic mode 330, the UE 115 may skip the monitoring of one or more PDSCH occasions during the duration 335. For instance, the UE 115 may skip the monitoring and reception of a PDSCH 315-*b* (e.g., an SPS PDSCH) that occurs (e.g., is transmitted) during the duration 335 and may be associated with HARQ feedback.

In a first example, the UE 115 may refrain from including PDSCH occasions that occur during the aperiodic mode 330 operation in a HARQ codebook transmitted to the device 205. For example, upon expiration of the duration 335, the UE 115 (e.g., and the device 205) may transition from the aperiodic mode 330 to a periodic DRX mode (e.g., at slot S6). At some time after transitioning to the periodic DRX mode, the UE 115 may transmit a feedback message via a physical uplink control channel (PUCCH) 325 that includes HARQ feedback information associated with the PDSCH 315-*a*. For example, the feedback message may include acknowledgement information (e.g., an acknowledgement (ACK), a negative ACK (NACK)) associated with the PDSCH 315-*a*. However here, the UE 115 may refrain from multiplexing acknowledgement information associated with the PDSCH 315-*b* with the acknowledgement information associated with the PDSCH 315-*a*, and may thus feedback message may exclude the acknowledgement information associated with the PDSCH 315-*b*.

In a second example, the UE 115 may include the PDSCH occasions that occur during the aperiodic mode 330 operation in a HARQ codebook transmitted to the device 205. For example, the UE 115 may multiplex the acknowledgement information associated with the PDSCH 315-*b* with the acknowledgement information associated with the PDSCH 315-*a* and may transmit the feedback message (e.g., via the PUCCH 325) to the device 205 that includes the acknowledgement information associated with the PDSCH 315-*b*. Here, the acknowledgement information associated with the PDSCH 315-*b* may include a NACK indication based on skipping the monitoring of the PDSCH 315-*b*. In this way, the UE 115 may avoid a misalignment between the device 205 and the UE 115 that may result if the UE 115 misses the triggering of the transition to the aperiodic mode 330 (e.g., fails to decode the PDCCH 320).

Figure 4:
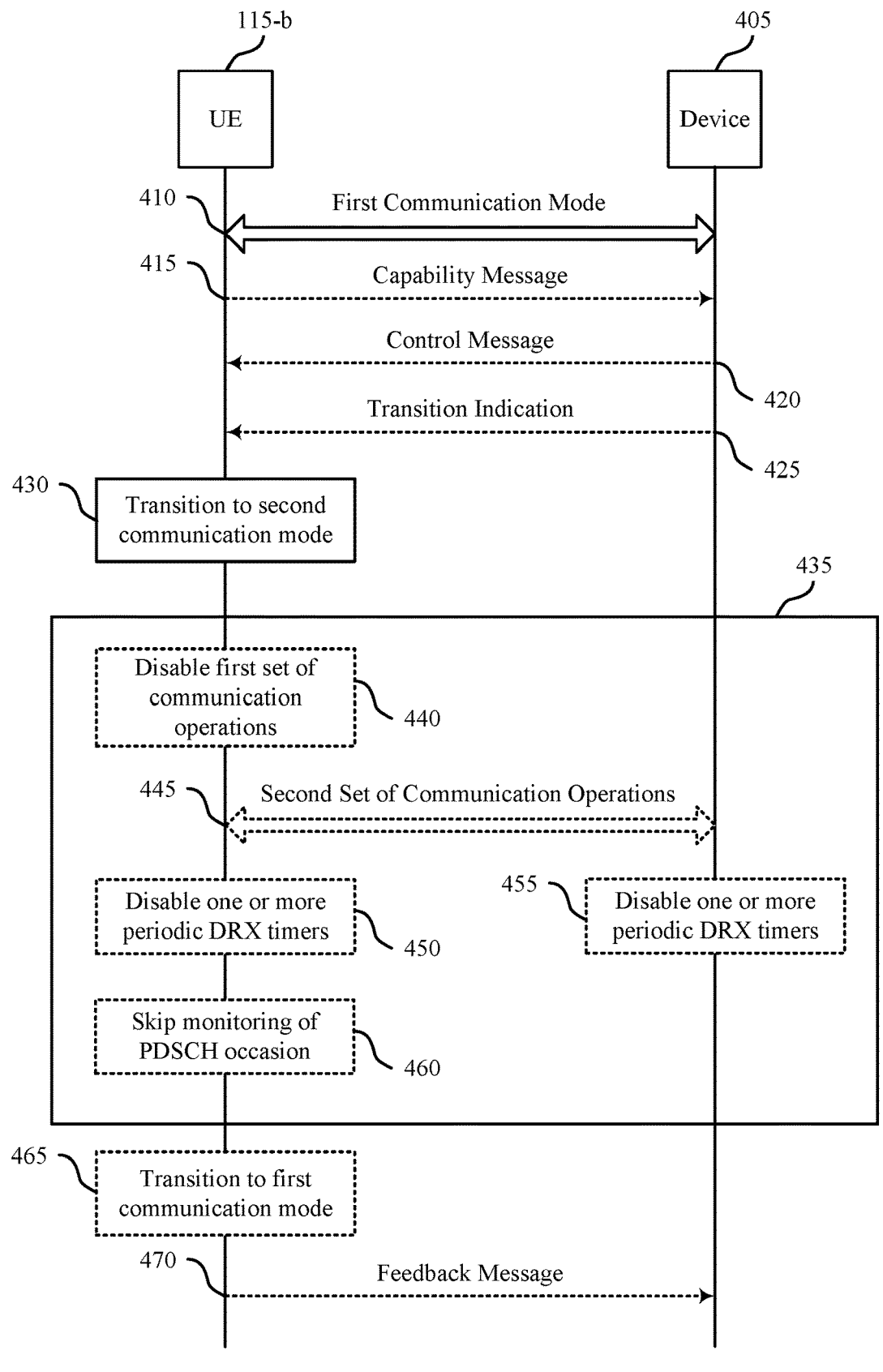
FIG. 4 illustrates an example of a process flow that supports techniques for aperiodic DRX mode communications in accordance with one or more aspects of the present disclosure.

FIG. 4 illustrates an example of a process flow 400 that supports techniques for aperiodic DRX mode communications in accordance with one or more aspects of the present disclosure. The process flow 400 may implement aspects of the wireless communications systems 100 and 200 or may be implemented by aspects of the wireless communications system 100 and 200 as described with reference to FIGS. 1 and 2, respectively. For example, the process flow 400 may be implemented by a UE 115-*b* and a device 505 to support aperiodic DRX mode operation to reduce power consumption, increase battery life, and reduce processing, spectral efficiency, and reliability. The process flow 400 may further be implemented by the UE 115-*b* and the device 405 to increase coordination between devices, spectral efficiency, and data rates.

The device 505 may be an example of a base station 105 or a UE 115, as described with reference to FIGS. 1 and 2. The UE 115-*b* may be an example of a UE 115, as described with reference to FIGS. 1 and 2. In the following description of the process flow 400, the operations may be performed in different orders or at different times. Some operations may also be omitted from the process flow 400, and other operations may be added to the process flow 400.

At 410, the UE 115-*b* and the device 405 may operate according to a first communication mode. For example, the UE 115-*b* and the device 405 may operate in a periodic DRX mode.

At 415, the UE 115-*b* may transmit a capability message to the device 405. The capability message may indicate a delay associated with transitioning between the periodic DRX mode and an aperiodic DRX mode. In some aspects, the delay may be a delay between triggering the transition to or from the aperiodic DRX mode and transitioning to or from the aperiodic DRX mode.

At 420, the device 405 may transmit a control message to the UE 115-*b*. In some aspects, the control message may indicate which communication operations are disabled during the aperiodic DRX mode operation and which communication operations are enabled during the aperiodic DRX mode operation. For example, the control message may include a set of flags that each correspond to a communication operation and indicate whether the communication operation is enabled or disabled. In some aspects, the control message may indicate a duration for which the UE 115-*b* (e.g., and the device 405) are to operate according to the aperiodic DRX mode.

At 425, the device 405 may transmit a transition indication to the UE 115-*b* that indicates for the UE 115-*b* to transition to the aperiodic DRX mode. In some aspects, the device 405 may transmit the transition indication via a PDCCH. In some other examples, the device 405 may transmit the transition indication via a MAC-CE. In some aspects, the transition indication may include an indication of the duration for which the UE 115-*b* (e.g., and the device 405) are to operate according to the aperiodic DRX mode.

At 430, the UE 115-*b* may transition to a second communication mode corresponding to the aperiodic DRX mode for the duration. In some aspects, the UE 115-*b* may transition to the aperiodic DRX mode in response to receiving the transition indication from the device 405. In some other examples, the UE 115-*b* may transition to the aperiodic DRX mode based on an expiration of a traffic inactivity timer associated with communications between the UE 115-*b* and the device 405.

At 435, the UE 115-b (e.g., and the device 405) may operate according to the aperiodic DRX mode. For example, at 440, the UE 115-b may disable a first set of communication operations (e.g., based on the set of configuration flags included in the control message), and thus may refrain from performing any of the first set of communication operations for the duration (e.g., while operating according to the aperiodic DRX mode). In some aspects, the first set of communication operations may include monitoring of a PDCCH, monitoring of a PDSCH, measuring a CSI-RS, periodic reporting of CSI, semi-persistent reporting of the CSI, transmission of an SRS, reception of a semi-persistent message, or transmission of a configured grant message, or a combination thereof.

At 445, the UE 115-b may perform a second set of communication operations with the device 405 that correspond to enabled communication operations for the aperiodic DRX mode (e.g., based on the set of configuration flags included in the control message). In some aspects, the second set of communication operations may include transmission of a scheduling request, aperiodic reporting of CSI, transmission of HARQ feedback, reception of a PDSCH message scheduled prior to transitioning to the aperiodic DRX mode, transmission of a PUSCH message scheduled prior to transitioning to the aperiodic DRX mode, or discontinuous monitoring of a PDCCH, or a combination thereof.

At 450, the UE 115-b may disable one or more periodic DRX timers. For example, the UE 115-b may disable a drx-onDurationTimer and a drx-InactivityTimer associated with the periodic DRX mode and may refrain from performing operations associated with an expiration of the one or more periodic DRX timers while operating in the aperiodic DRX mode.

At 460, the UE 115-b may skip the monitoring of one or more PDSCH occasions that occur during the aperiodic DRX mode operation. For example, a semi-persistent PDSCH occasion may during the duration of the aperiodic DRX mode and the UE 115-b may skip the monitoring of the PDSCH occasion based on operating according to the aperiodic DRX mode.

At 465, the UE 115-b (e.g., and the device 405) may transition from the second communication mode (e.g., the aperiodic DRX mode) to the first communication mode (e.g., the periodic DRX mode). For example, upon an expiration of the duration, the UE 115-b may transition back to the periodic DRX mode.

At 470, the UE 115-b may transmit a feedback message to the device 405. In some aspects, the feedback message may include HARQ acknowledgement information associated with the skipped PDSCH occasion. In some other examples, the feedback message may exclude the HARQ acknowledgement information.

Figure 5:
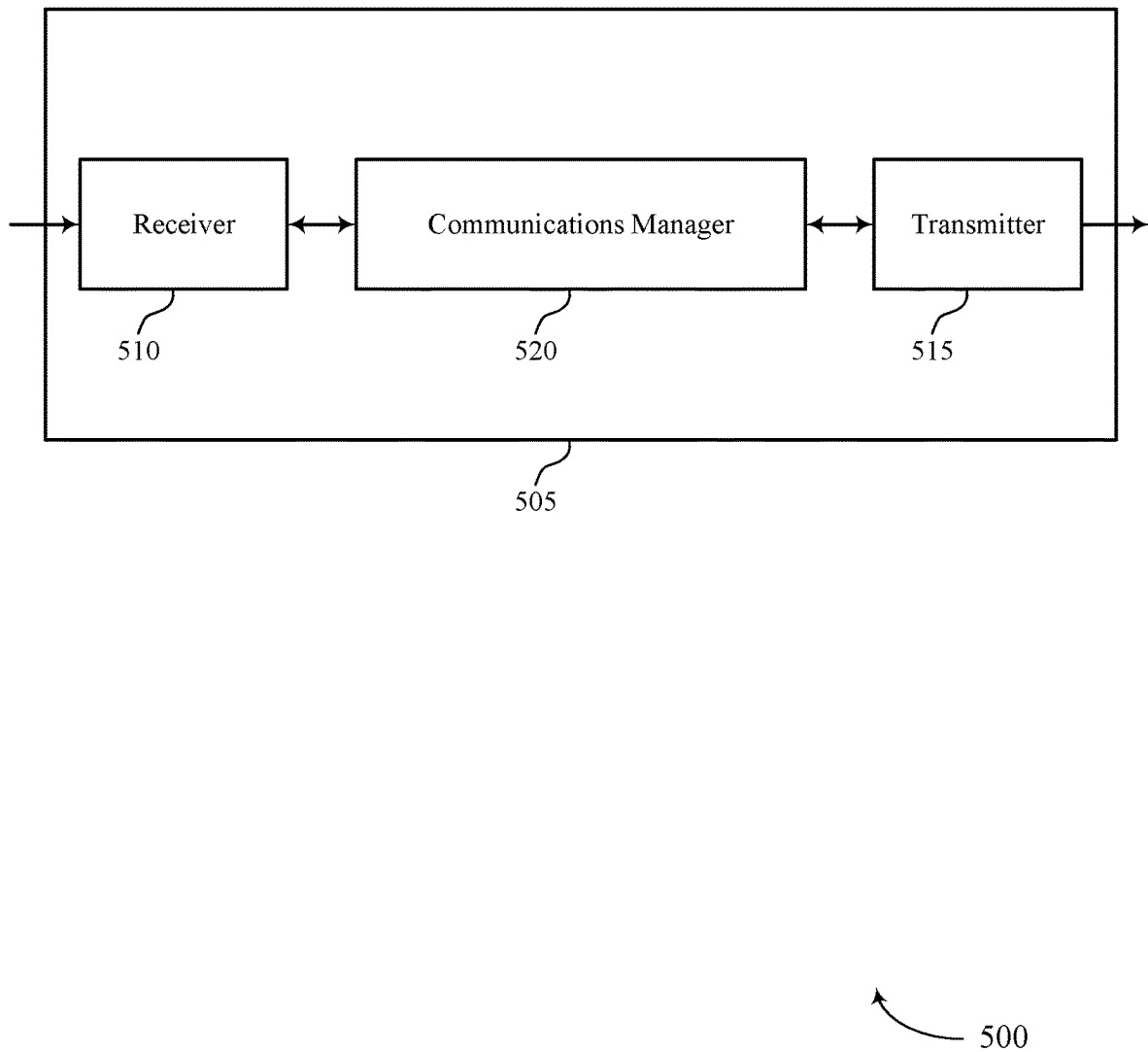
FIGS. 5 and 6 show block diagrams of devices that support techniques for aperiodic DRX mode communications in accordance with one or more aspects of the present disclosure.

FIG. 5 shows a block diagram 500 of a device 505 that supports techniques for aperiodic DRX mode communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for aperiodic DRX mode communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for aperiodic DRX mode communications). In some aspects, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for aperiodic DRX mode communications as described herein. For example, the communications manager 520, the receiver 510, the transmitter 515, or various combinations or components thereof may support a method for performing one or more of the functions described herein.

In some aspects, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally or alternatively, In some aspects, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some aspects, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for communicating with a device in a wireless network according to a first communication mode, the first communication mode including a periodic DRX mode. The communications manager 520 may be configured as or otherwise support a means for transitioning to a second communication mode based on a transition indication, the second communication mode including an aperiodic DRX mode. The communications manager 520 may be configured as or otherwise support a means for operating according to the second communication mode for a duration of time.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and reduced power consumption by supporting operating according to an aperiodic DRX mode.

Figure 6:
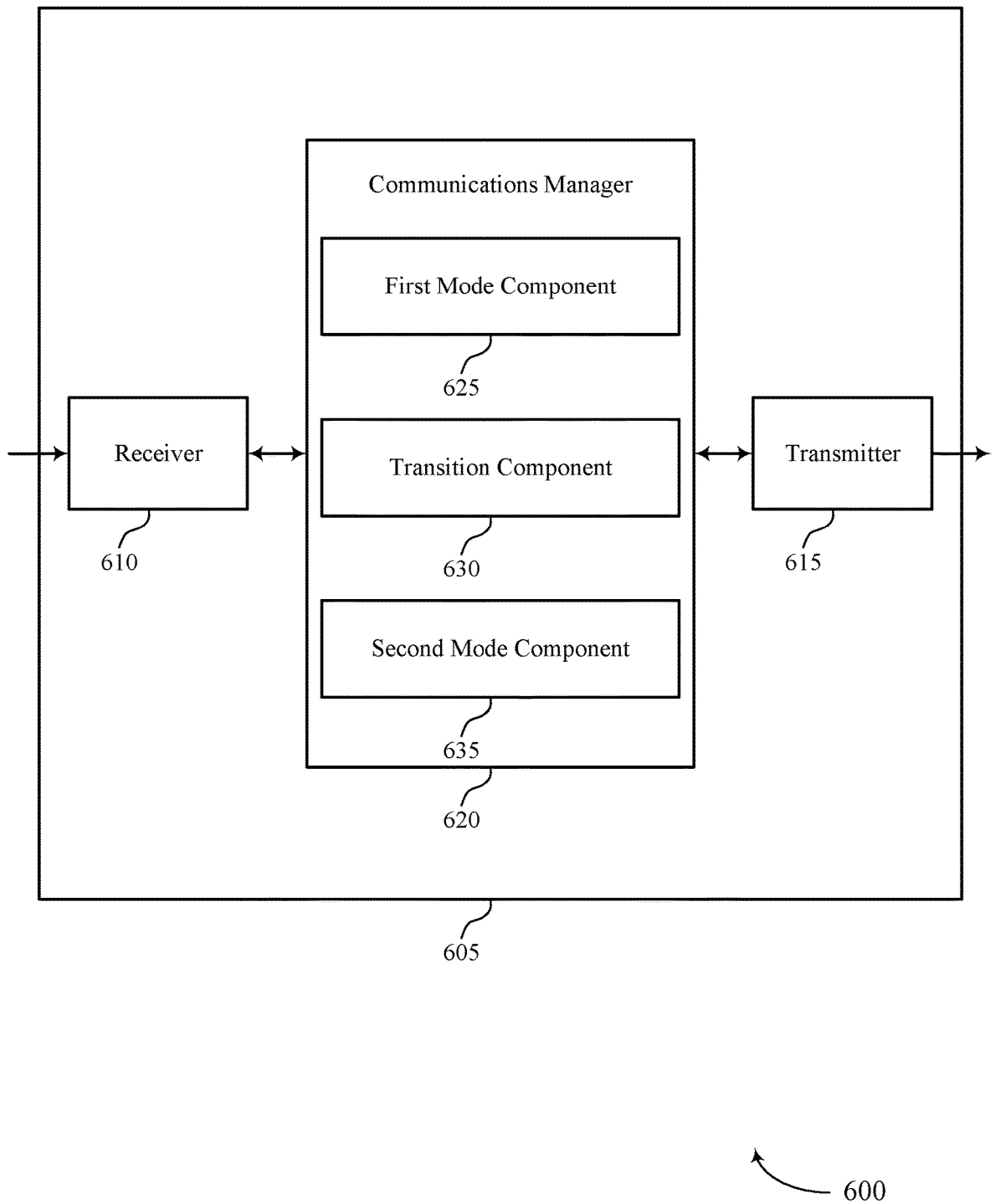

FIG. 6 shows a block diagram 600 of a device 605 that supports techniques for aperiodic DRX mode communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for aperiodic DRX mode communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for aperiodic DRX mode communications). In some aspects, the transmitter 615 may be co-located with a receiver 610 in a transceiver module. The transmitter 615 may utilize a single antenna or a set of multiple antennas.

The device 605, or various components thereof, may be an example of means for performing various aspects of techniques for aperiodic DRX mode communications as described herein. For example, the communications manager 620 may include a first mode component 625, a transition component 630, a second mode component 635, or any combination thereof. The communications manager 620 may be an example of aspects of a communications manager 520 as described herein. In some aspects, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The first mode component 625 may be configured as or otherwise support a means for communicating with a device in a wireless network according to a first communication mode, the first communication mode including a periodic DRX mode. The transition component 630 may be configured as or otherwise support a means for transitioning to a second communication mode based on a transition indication, the second communication mode including an aperiodic DRX mode. The second mode component 635 may be configured as or otherwise support a means for operating according to the second communication mode for a duration of time.

Figure 7:
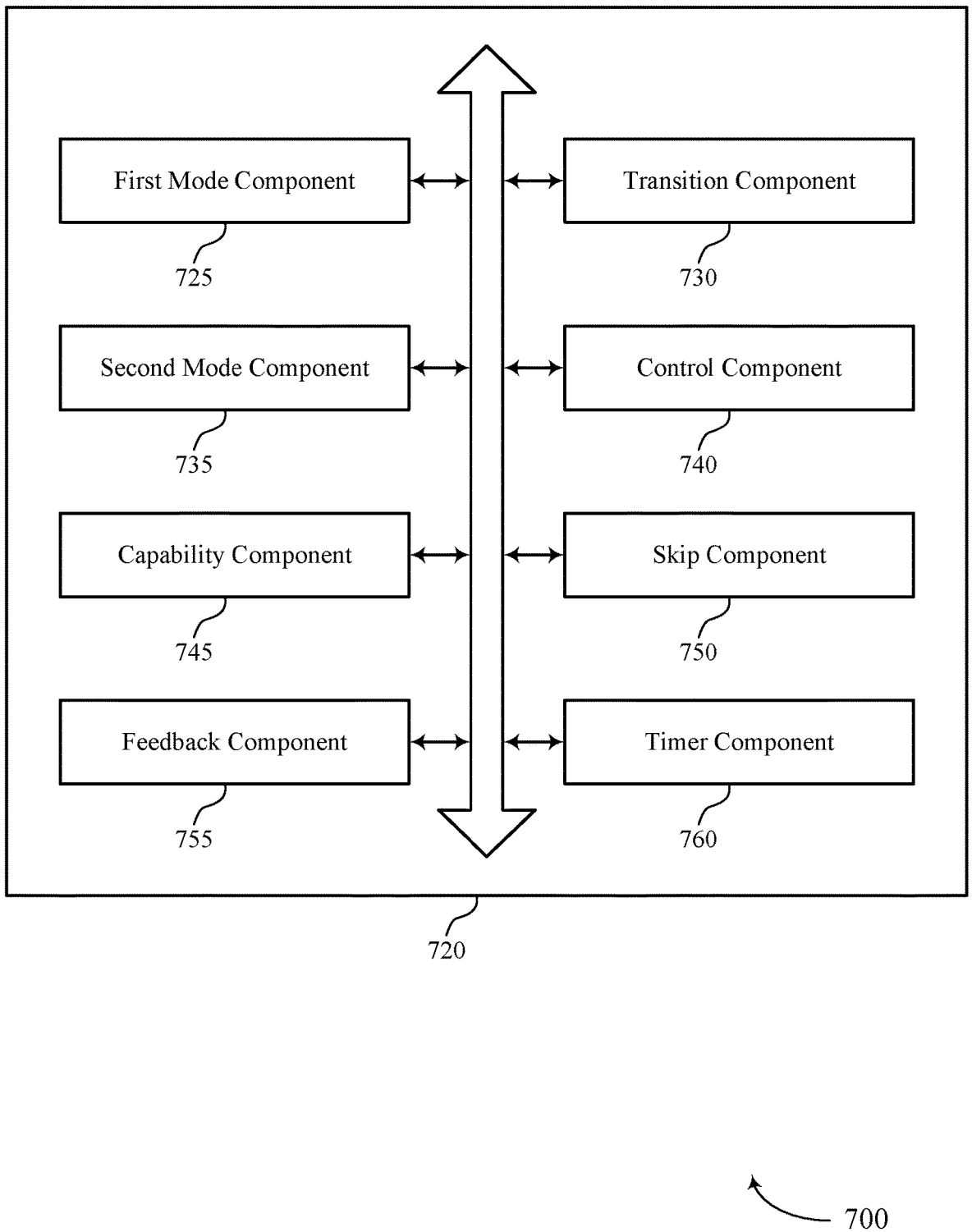
FIG. 7 shows a block diagram of a communications manager that supports techniques for aperiodic DRX mode communications in accordance with one or more aspects of the present disclosure.

FIG. 7 shows a block diagram 700 of a communications manager 720 that supports techniques for aperiodic DRX mode communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for aperiodic DRX mode communications as described herein. For example, the communications manager 720 may include a first mode component 725, a transition component 730, a second mode component 735, a control component 740, a capability component 745, a skip component 750, a feedback component 755, a timer component 760, or any combination thereof. Each of these components may communicate, directly or indirectly, with one another (e.g., via one or more buses).

The communications manager 720 may support wireless communication at a UE in accordance with examples as disclosed herein. The first mode component 725 may be configured as or otherwise support a means for communicating with a device in a wireless network according to a first communication mode, the first communication mode including a periodic DRX mode. The transition component 730 may be configured as or otherwise support a means for transitioning to a second communication mode based on a transition indication, the second communication mode including an aperiodic DRX mode. The second mode component 735 may be configured as or otherwise support a means for operating according to the second communication mode for a duration of time.

In some aspects, to support operating according to the second communication mode, the second mode component 735 may be configured as or otherwise support a means for disabling a first set of communication operations for the duration.

In some aspects, a communication operation of the first set of communication operations includes at least monitoring of a PDCCH, measuring a CSI-RS, periodic reporting of CSI, semi-persistent reporting of the CSI, transmission of an SRS, reception of a semi-persistent message, or transmission of a configured grant message, or a combination thereof.

In some aspects, to support operating according to the second communication mode, the second mode component 735 may be configured as or otherwise support a means for performing a second set of communication operations during the duration.

In some aspects, a communication operation of the second set of communication operations includes at least transmission of a scheduling request, aperiodic reporting of CSI, transmission of HARQ feedback, reception of a PDSCH message scheduled prior to transitioning to the second communication mode, transmission of a PUSCH message scheduled prior to transitioning to the second communication mode, or discontinuous monitoring of a PDCCH, or a combination thereof.

In some aspects, the control component 740 may be configured as or otherwise support a means for receiving a control message indicating a first set of communication operations that are disabled for the duration, a second set of communication operations that are enabled for the duration, or a combination thereof.

In some aspects, the control message includes a set of flags, each flag of the set of flags corresponding to a communication operation of the first set of communication operations or the second set of communication operations and indicating whether the communication operation is disabled or enabled.

In some aspects, the control component 740 may be configured as or otherwise support a means for receiving a control message including the transition indication, where transitioning to the second communication mode is based on receiving the control message.

In some aspects, the control message further includes an indication of a time period for remaining in the second communication mode, the duration corresponding to the time period.

In some aspects, the indication of the time period includes an index of a set of indexes corresponding to a set of time periods for remaining in the second communication mode, the index corresponding to the time period, the set of time periods including the time period.

In some aspects, the control message includes a PDCCH message, a MAC-CE message, or a combination thereof.

In some aspects, the transition indication includes a timer associated with traffic inactivity between the UE and the device, the transitioning to the second communication mode based on an expiration of the timer.

In some aspects, the capability component 745 may be configured as or otherwise support a means for transmitting a capability message that indicates a delay associated with transitioning between the first communication mode and the second communication mode, where operating according to the second communication mode is based on the delay.

In some aspects, the skip component 750 may be configured as or otherwise support a means for skipping monitoring of a PDSCH occasion that occurs during the duration based on operating according to the second communication mode. In some aspects, the transition component 730 may be configured as or otherwise support a means for transitioning from the second communication mode to the first communication mode based on an expiration of the duration. In some aspects, the feedback component 755 may be configured as or otherwise support a means for transmitting, to the device, a feedback message that excludes acknowledgement information associated with the skipped PDSCH occasion based on operating according to the second communication mode during the PDSCH occasion.

In some aspects, the skip component 750 may be configured as or otherwise support a means for skipping monitoring of a PDSCH occasion that occurs during the duration based on operating according to the second communication mode. In some aspects, the transition component 730 may be configured as or otherwise support a means for transitioning from the second communication mode to the first communication mode based on an expiration of the duration. In some aspects, the feedback component 755 may be configured as or otherwise support a means for transmitting, to the device, a feedback message that includes acknowledgement information associated with the skipped PDSCH occasion.

In some aspects, the timer component 760 may be configured as or otherwise support a means for disabling one or more timers associated with the periodic DRX mode for the duration based on operating according to the second communication mode.

In some aspects, the second communication mode is associated with a first set of component carriers of a carrier group, a second set of component carriers of a DRX group, or a combination thereof.

Figure 8:
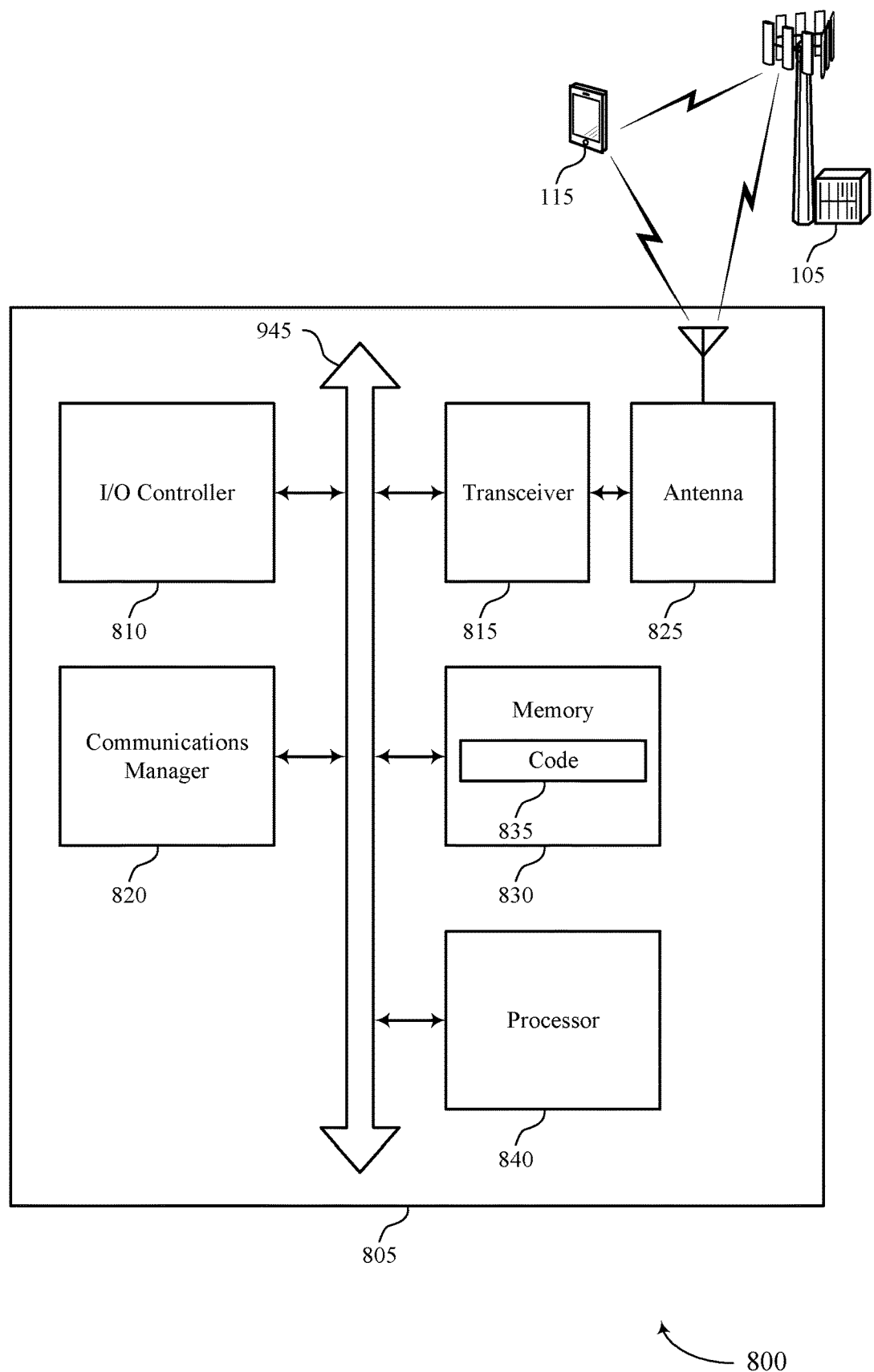
FIG. 8 shows a diagram of a system including a device that supports techniques for aperiodic DRX mode communications in accordance with one or more aspects of the present disclosure.

FIG. 8 shows a diagram of a system 800 including a device 805 that supports techniques for aperiodic DRX mode communications in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code

835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for aperiodic DRX mode communications). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for communicating with a device in a wireless network according to a first communication mode, the first communication mode including a periodic DRX mode. The communications manager 820 may be configured as or otherwise support a means for transitioning to a second communication mode based on a transition indication, the second communication mode including an aperiodic DRX mode. The communications manager 820 may be configured as or otherwise support a means for operating according to the second communication mode for a duration of time.

By including or configuring the communications manager 820 in accordance with examples as described herein, the device 805 may support techniques for reduced power consumption, longer battery life, reduced processing, increased coordination between devices, increased data rates, and increased spectral efficiency.

In some aspects, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, In some aspects, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for aperiodic DRX mode communications as described herein, or the processor 840 and the memory 830 may be otherwise configured to perform or support such operations.

Figure 9:
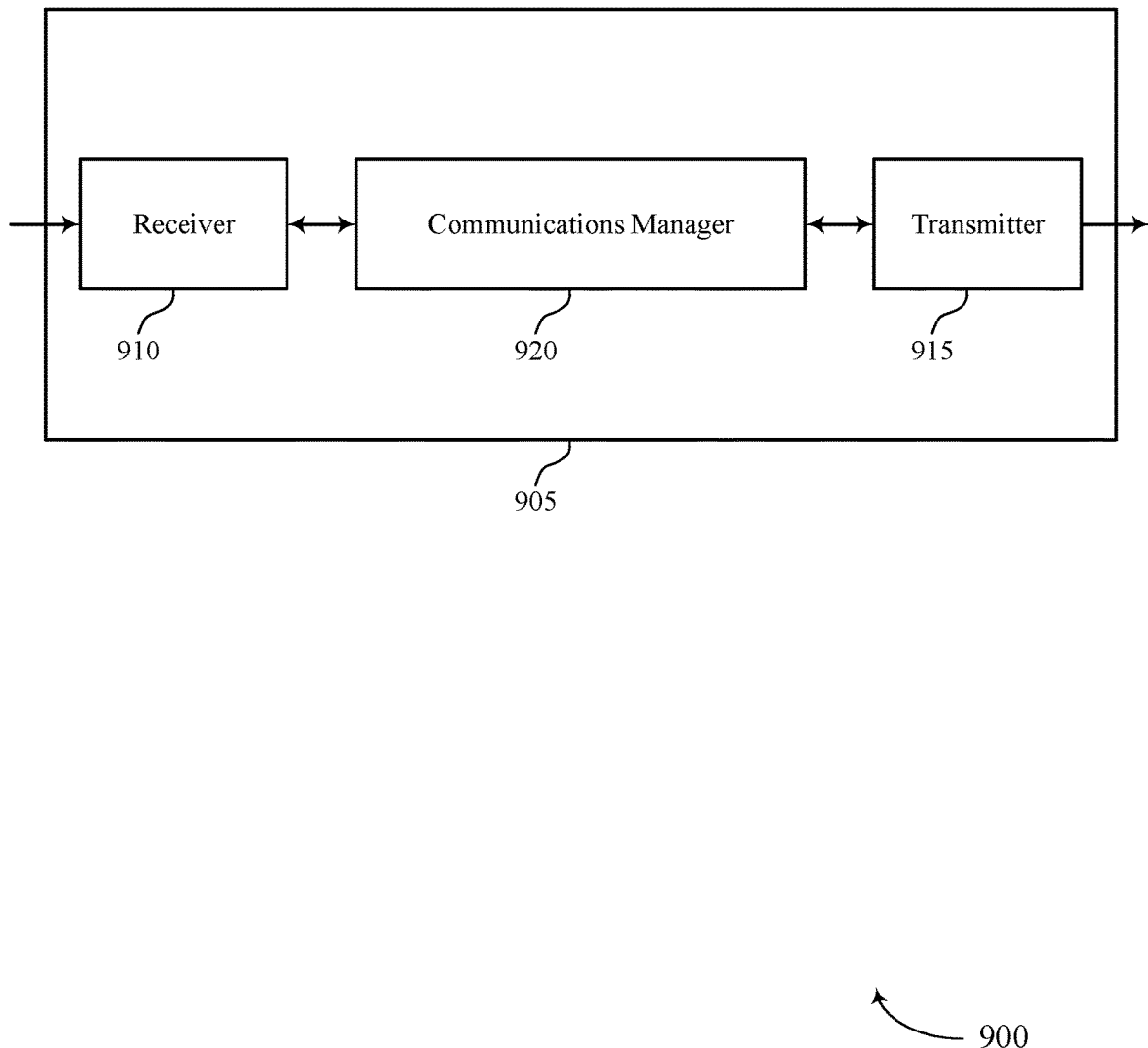
FIGS. 9 and 10 show block diagrams of devices that support techniques for aperiodic DRX mode communications in accordance with one or more aspects of the present disclosure.

FIG. 9 shows a block diagram 900 of a device 905 that supports techniques for aperiodic DRX mode communications in accordance with one or more aspects of the present disclosure. The device 905 may be an example of aspects of a base station 105 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for aperiodic DRX mode communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for aperiodic DRX mode communications). In some aspects, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for aperiodic DRX mode communications as described herein. For example, the communications manager 920, the receiver 910, the transmitter 915, or various combinations or components thereof may support a method for performing one or more of the functions described herein.

In some aspects, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally or alternatively, In some aspects, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some aspects, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a device in a wireless network in accordance with examples as disclosed herein. For example, the communications manager 920 may be configured as or otherwise support a means for communicating with a UE according to a first communication mode, the first communication mode including a periodic DRX mode. The communications manager 920 may be configured as or otherwise support a means for communicating with the UE according to a second communication mode for a duration based on a transition indication, the second communication mode including an aperiodic DRX mode.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing and reduced power consumption by supporting operating according to an aperiodic DRX mode.

Figure 10:
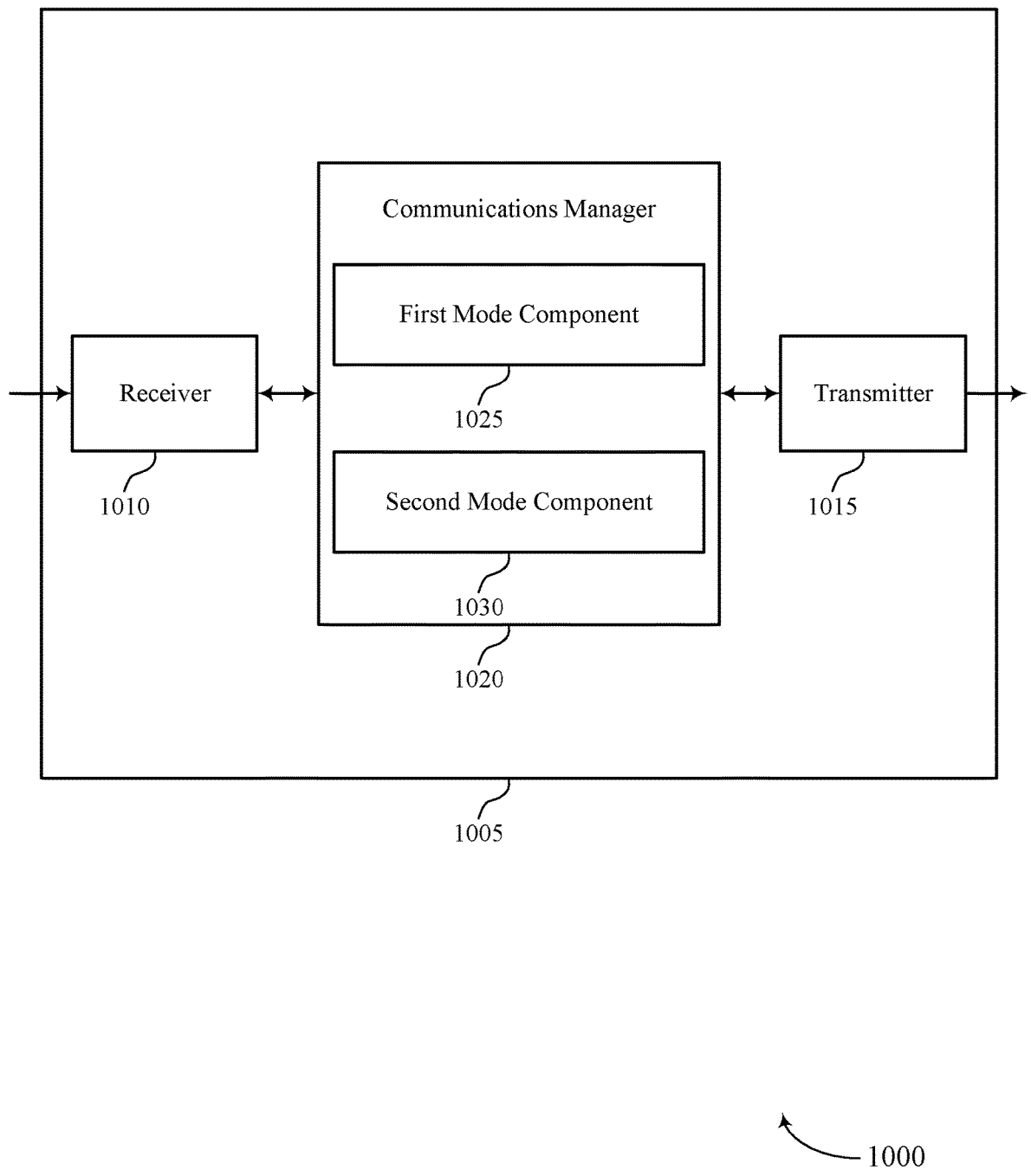

FIG. 10 shows a block diagram 1000 of a device 1005 that supports techniques for aperiodic DRX mode communications in accordance with one or more aspects of the present disclosure. The device 1005 may be an example of aspects of a device 905, a base station 105, or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for aperiodic DRX mode communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for aperiodic DRX mode communications). In some aspects, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for aperiodic DRX mode communications as described herein. For example, the communications manager 1020 may include a first mode component 1025 a second mode component 1030, or any combination thereof. The communications manager 1020 may be an example of aspects of a communications manager 920 as described herein. In some aspects, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a device in a wireless network in accordance with examples as disclosed herein. The first mode component 1025 may be configured as or otherwise support a means for communicating with a UE according to a first communication mode, the first communication mode including a periodic DRX mode. The second mode component 1030 may be configured as or otherwise support a means for communicating with the UE according to a second communication mode for a duration based on a transition indication, the second communication mode including an aperiodic DRX mode.

Figure 11:
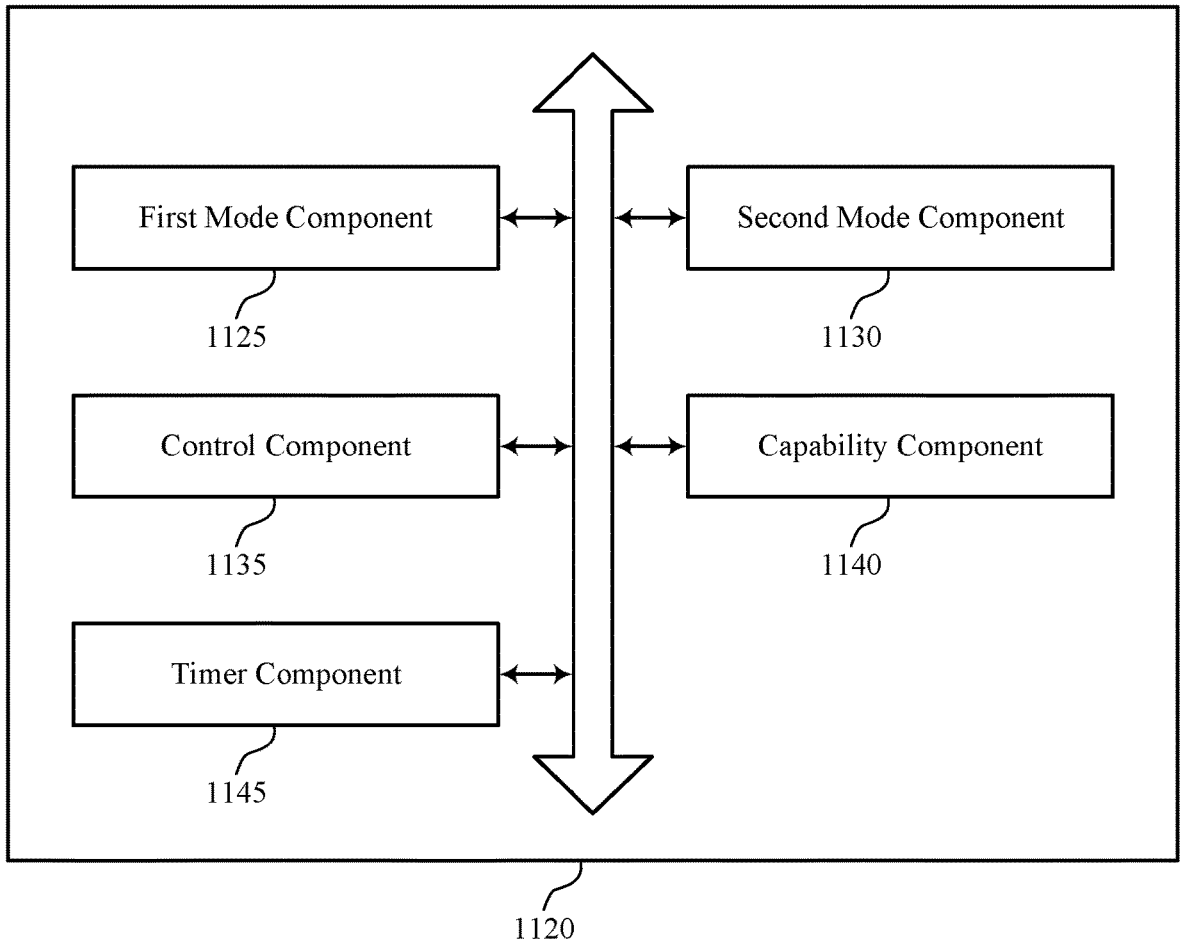
FIG. 11 shows a block diagram of a communications manager that supports techniques for aperiodic DRX mode communications in accordance with one or more aspects of the present disclosure.

FIG. 11 shows a block diagram 1100 of a communications manager 1120 that supports techniques for aperiodic DRX mode communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for aperiodic DRX mode communications as described herein. For example, the communications manager 1120 may include a first mode component 1125, a second mode component 1130, a control component 1135, a capability component 1140, a timer component 1145, or any combination thereof. Each of these components may communicate, directly or indirectly, with one another (e.g., via one or more buses).

The communications manager 1120 may support wireless communication at a device in a wireless network in accordance with examples as disclosed herein. The first mode component 1125 may be configured as or otherwise support a means for communicating with a UE according to a first communication mode, the first communication mode including a periodic DRX mode. The second mode component 1130 may be configured as or otherwise support a means for communicating with the UE according to a second communication mode for a duration based on a transition indication, the second communication mode including an aperiodic DRX mode.

In some aspects, the transition indication indicates for the UE to disable a first set of communication operations for the duration.

In some aspects, the second mode component 1130 may be configured as or otherwise support a means for performing a second set of communication operations during the duration based on communicating with the UE according to the second communication mode, where a communication operation of the second set of communication operations includes at least reception of a scheduling request, reception of an A-CSI report, reception of HARQ feedback, transmission of a PDSCH message scheduled prior to transitioning to the second communication mode, reception of a PUSCH message scheduled prior to transitioning to the second communication mode, transmission of a discontinuous PDCCH message, or a combination thereof.

In some aspects, the control component 1135 may be configured as or otherwise support a means for transmitting, to the UE, a control message indicating a first set of communication operations that are disabled for the duration, a second set of communication operations that are enabled for the duration, or a combination thereof.

In some aspects, the control message includes a set of flags, each flag corresponding to a communication operation of the first set of communication operations or the second set of communication operations and indicating whether the communication operation is disabled or enabled.

In some aspects, the control component 1135 may be configured as or otherwise support a means for transmitting a control message including the transition indication, where communicating with the UE according to the second communication mode is based on transmitting the control message.

In some aspects, the control message further includes an indication of a time period for remaining in the second communication mode, the duration corresponding to the time period.

In some aspects, the indication of the time period includes an index of a set of indexes corresponding to a set of time periods for remaining in the second communication mode, the index corresponding to the time period, the set of time periods including the time period.

In some aspects, the transition indication includes a timer associated with traffic inactivity between the device and the UE, the communicating with the UE according to the second communication mode based on an expiration of the timer.

In some aspects, the capability component 1140 may be configured as or otherwise support a means for receiving, from the UE, a capability message that indicates a delay associated with transitioning between the first communication mode and the second communication mode, where communicating with the UE according to the second communication mode is based on the delay.

In some aspects, the timer component 1145 may be configured as or otherwise support a means for disabling one or more timers associated with the periodic DRX mode for the duration based on communicating with the UE according to the second communication mode.

In some aspects, the second communication mode is associated with a first set of component carriers of a carrier group, a second set of component carriers of a DRX group, or a combination thereof.

Figure 12:
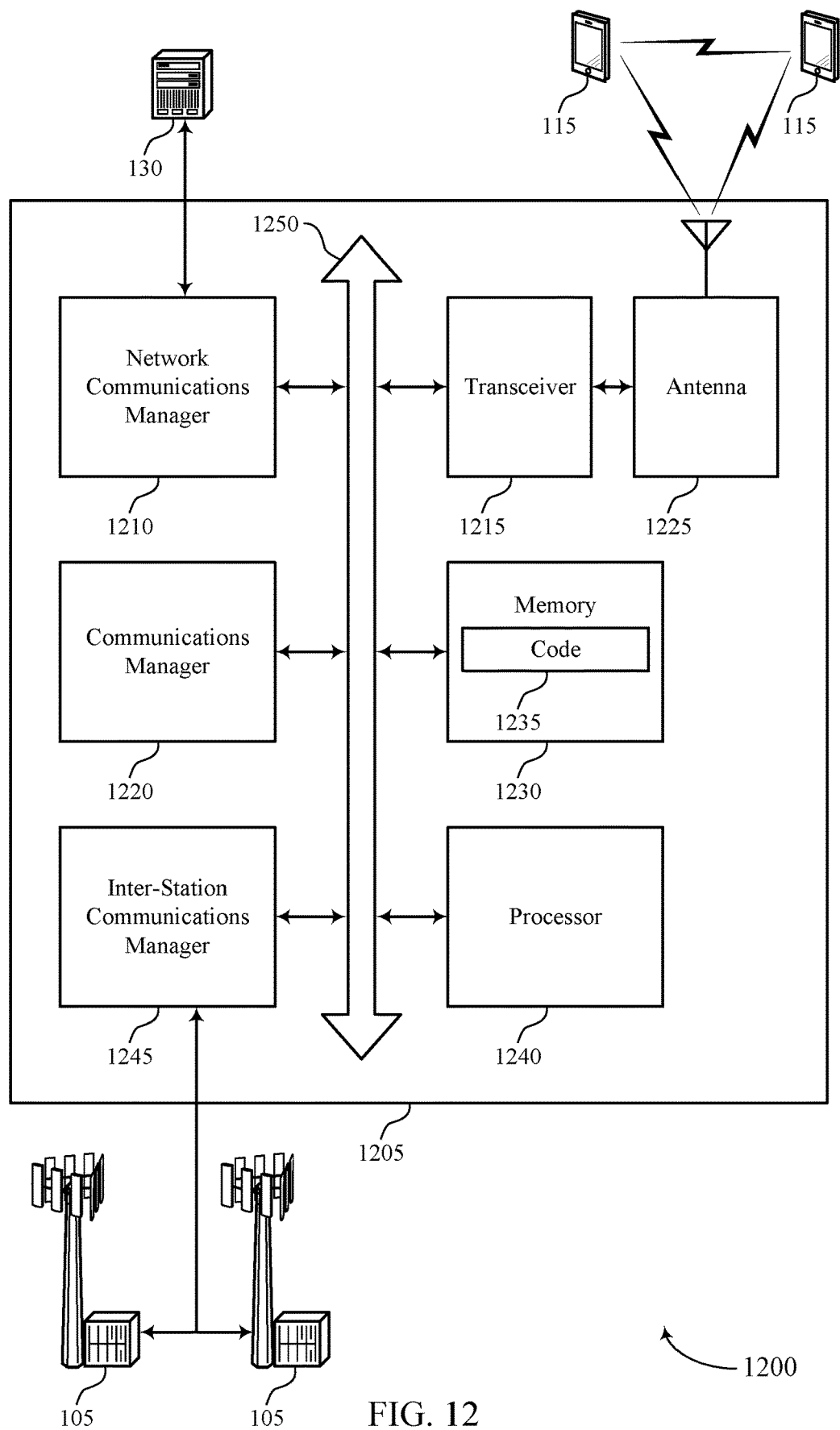
FIG. 12 shows a diagram of a system including a device that supports techniques for aperiodic DRX mode communications in accordance with one or more aspects of the present disclosure.

FIG. 12 shows a diagram of a system 1200 including a device 1205 that supports techniques for aperiodic DRX mode communications in accordance with one or more aspects of the present disclosure. The device 1205 may be an example of or include the components of a device 905, a device 1005, a base station 105, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, an inter-station communications manager 1245, or a combination thereof. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for aperiodic DRX mode communications). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some aspects, the inter-station communications manager 1245 may provide an X2 interface within an LTE/LTE-A wireless communications network technology to provide communication between base stations 105.

The communications manager 1220 may support wireless communication at a device in a wireless network in accordance with examples as disclosed herein. For example, the communications manager 1220 may be configured as or otherwise support a means for communicating with a UE according to a first communication mode, the first communication mode including a periodic DRX mode. The communications manager 1220 may be configured as or otherwise support a means for communicating with the UE according to a second communication mode for a duration based on a transition indication, the second communication mode including an aperiodic DRX mode.

By including or configuring the communications manager 1220 in accordance with examples as described herein, the device 1205 may support techniques for reduced power consumption, longer battery life, reduced processing, increased coordination between devices, increased data rates, and increased spectral efficiency.

In some aspects, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, In some aspects, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for aperiodic DRX mode communications as described herein, or the processor 1240 and the memory 1230 may be otherwise configured to perform or support such operations.

Figure 13:
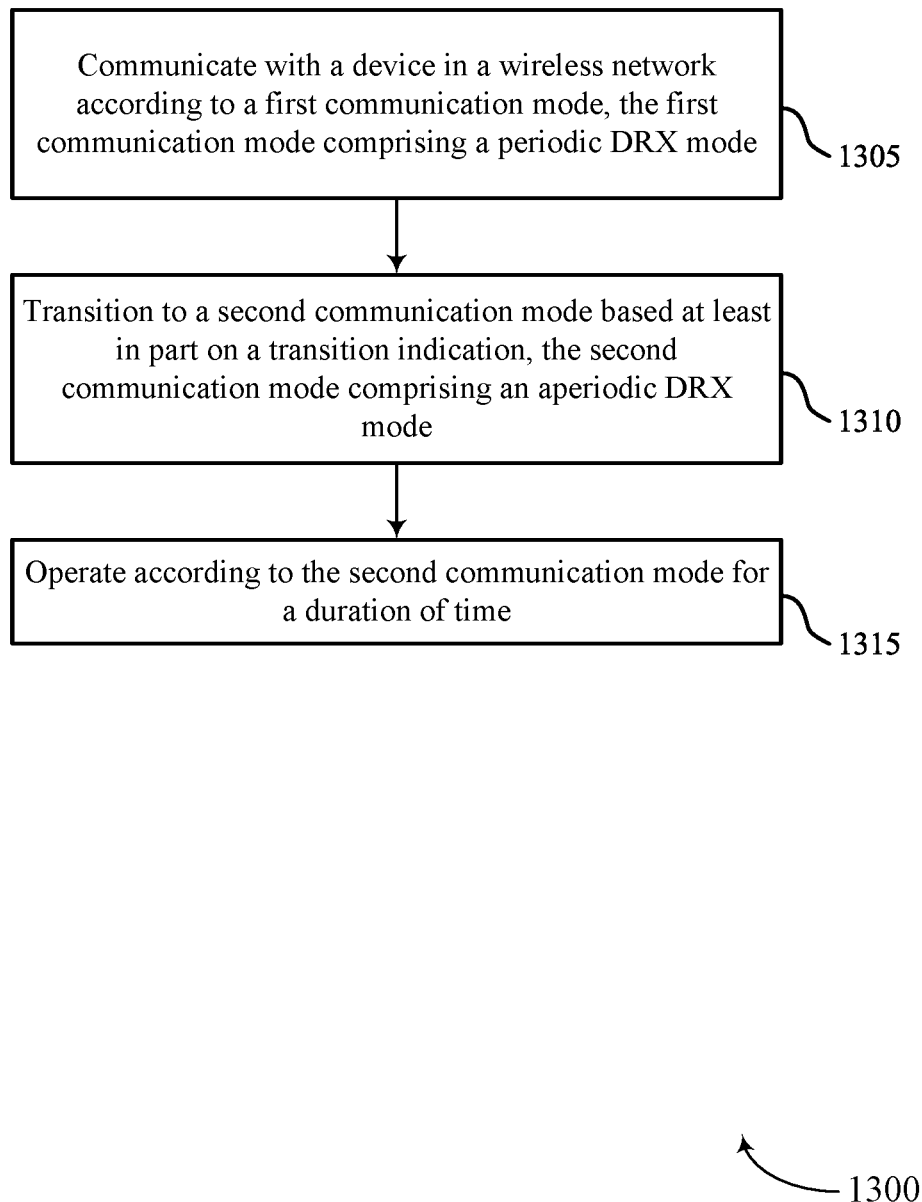
FIGS. 13 through 19 show flowcharts illustrating methods that support techniques for aperiodic DRX mode communications in accordance with one or more aspects of the present disclosure.

FIG. 13 shows a flowchart illustrating a method 1300 that supports techniques for aperiodic DRX mode communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some aspects, a UE may execute a set of instructions to control the functional elements of the UE to perform the described functions. Additionally or alternatively, the UE may perform aspects of the described functions using special-purpose hardware.

At 1305, the method may include communicating with a device in a wireless network according to a first communication mode, the first communication mode including a periodic DRX mode. The operations of 1305 may be performed in accordance with examples as disclosed herein. In some aspects, aspects of the operations of 1305 may be performed by a first mode component 725 as described with reference to FIG. 7.

At 1310, the method may include transitioning to a second communication mode based on a transition indication, the second communication mode including an aperiodic DRX mode. The operations of 1310 may be performed in accordance with examples as disclosed herein. In some aspects, aspects of the operations of 1310 may be performed by a transition component 730 as described with reference to FIG. 7.

At 1315, the method may include operating according to the second communication mode for a duration of time. The operations of 1315 may be performed in accordance with examples as disclosed herein. In some aspects, aspects of the operations of 1315 may be performed by a second mode component 735 as described with reference to FIG. 7.

Figure 14:
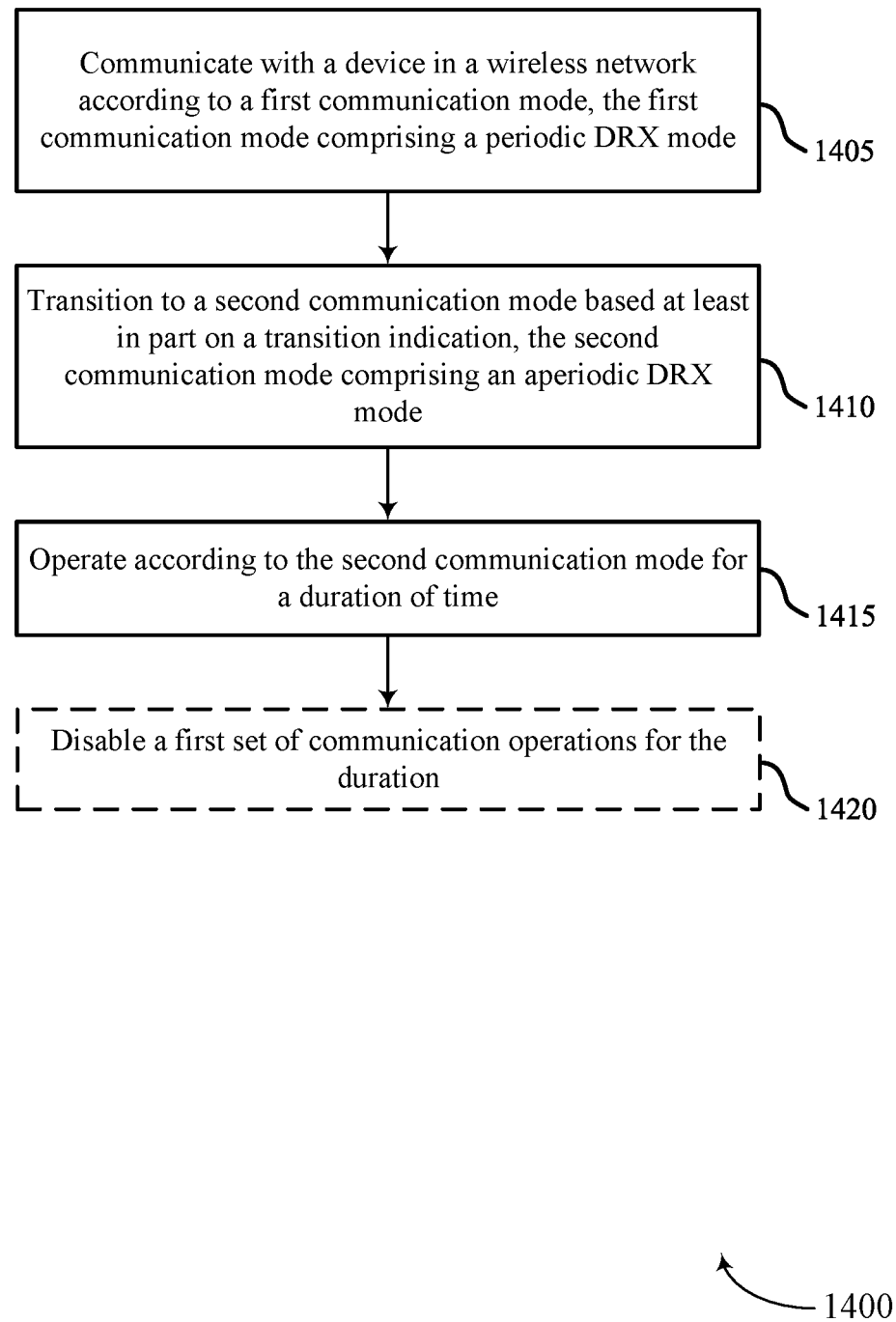

FIG. 14 shows a flowchart illustrating a method 1400 that supports techniques for aperiodic DRX mode communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some aspects, a UE may execute a set of instructions to control the functional elements of the UE to perform the described functions. Additionally or alternatively, the UE may perform aspects of the described functions using special-purpose hardware.

At 1405, the method may include communicating with a device in a wireless network according to a first communication mode, the first communication mode including a periodic DRX mode. The operations of 1405 may be performed in accordance with examples as disclosed herein. In some aspects, aspects of the operations of 1405 may be performed by a first mode component 725 as described with reference to FIG. 7.

At 1410, the method may include transitioning to a second communication mode based on a transition indication, the second communication mode including an aperiodic DRX mode. The operations of 1410 may be performed in accordance with examples as disclosed herein. In some aspects, aspects of the operations of 1410 may be performed by a transition component 730 as described with reference to FIG. 7.

At 1415, the method may include operating according to the second communication mode for a duration of time. The operations of 1415 may be performed in accordance with examples as disclosed herein. In some aspects, aspects of the operations of 1415 may be performed by a second mode component 735 as described with reference to FIG. 7.

At 1420, the method may include disabling a first set of communication operations for the duration. The operations of 1420 may be performed in accordance with examples as disclosed herein. In some aspects, aspects of the operations of 1420 may be performed by a second mode component 735 as described with reference to FIG. 7.

Figure 15:
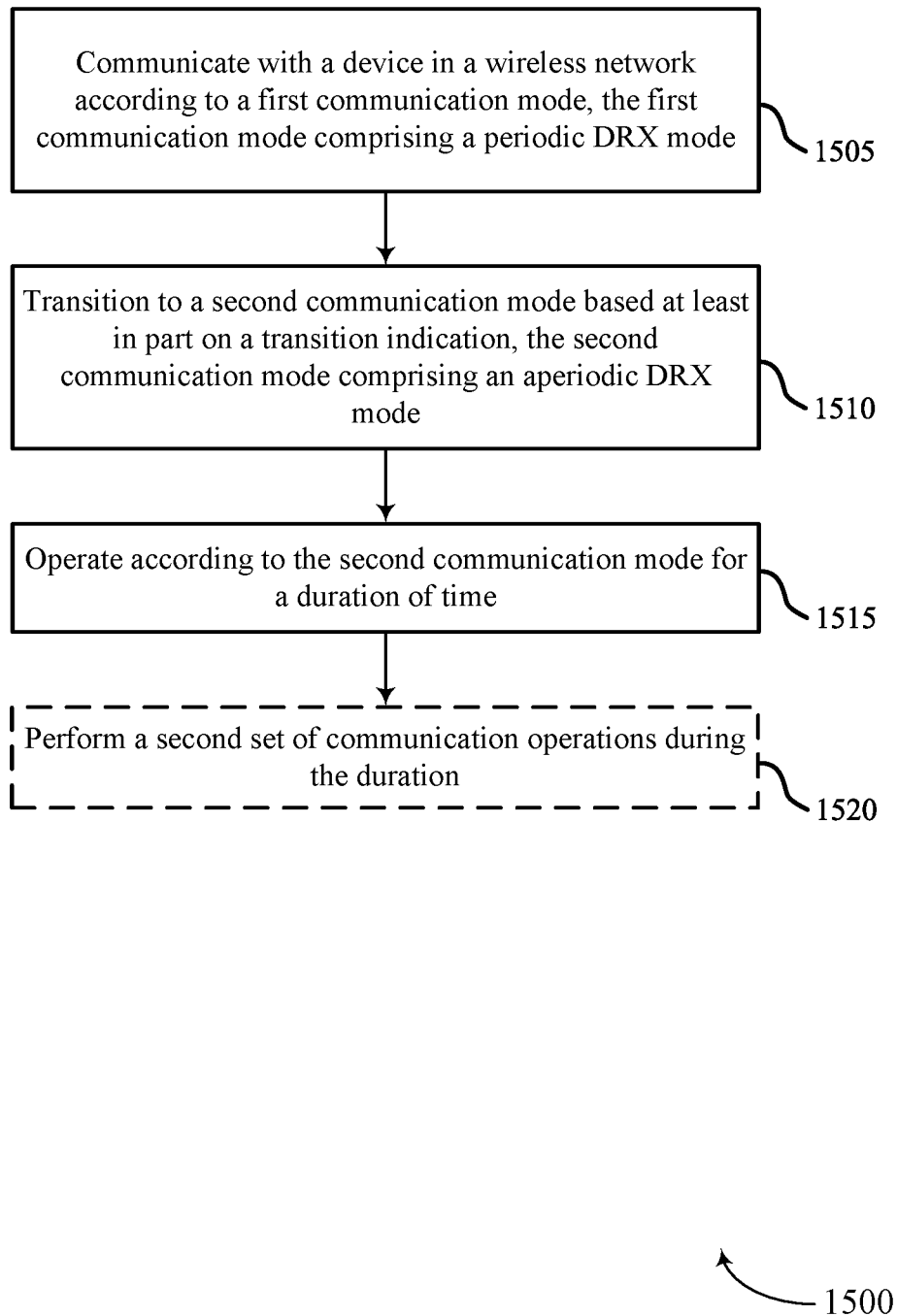

FIG. 15 shows a flowchart illustrating a method 1500 that supports techniques for aperiodic DRX mode communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some aspects, a UE may execute a set of instructions to control the functional elements of the UE to perform the described functions. Additionally or alternatively, the UE may perform aspects of the described functions using special-purpose hardware.

At 1505, the method may include communicating with a device in a wireless network according to a first communication mode, the first communication mode including a periodic DRX mode. The operations of 1505 may be performed in accordance with examples as disclosed herein. In some aspects, aspects of the operations of 1505 may be performed by a first mode component 725 as described with reference to FIG. 7.

At 1510, the method may include transitioning to a second communication mode based on a transition indication, the second communication mode including an aperiodic DRX mode. The operations of 1510 may be performed in accordance with examples as disclosed herein. In some aspects, aspects of the operations of 1510 may be performed by a transition component 730 as described with reference to FIG. 7.

At 1515, the method may include operating according to the second communication mode for a duration of time. The operations of 1515 may be performed in accordance with examples as disclosed herein. In some aspects, aspects of the operations of 1515 may be performed by a second mode component 735 as described with reference to FIG. 7.

At 1520, the method may include performing a second set of communication operations during the duration. The operations of 1520 may be performed in accordance with examples as disclosed herein. In some aspects, aspects of the operations of 1520 may be performed by a second mode component 735 as described with reference to FIG. 7.

Figure 16:
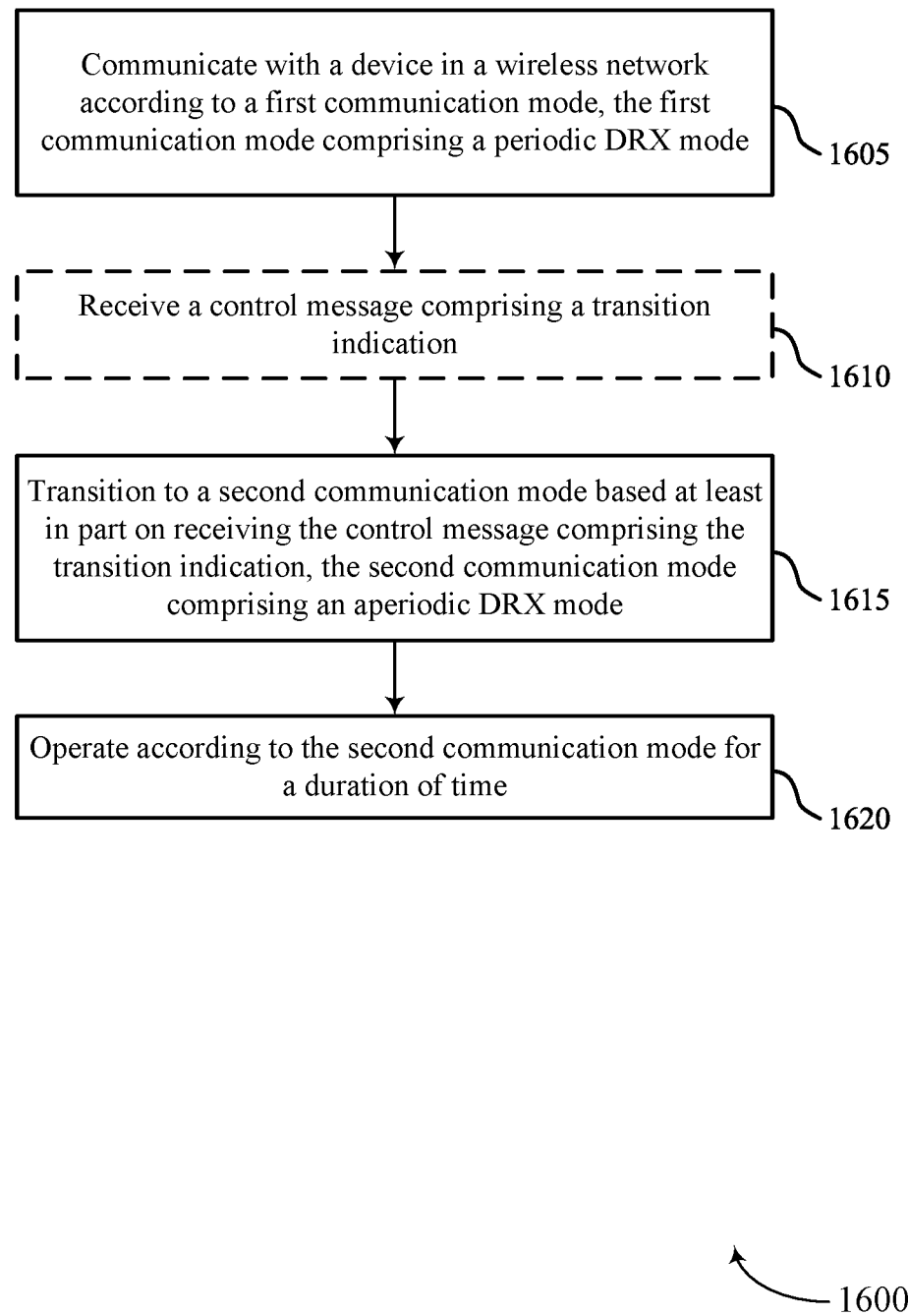

FIG. 16 shows a flowchart illustrating a method 1600 that supports techniques for aperiodic DRX mode communications in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some aspects, a UE may execute a set of instructions to control the functional elements of the UE to perform the described functions. Additionally or alternatively, the UE may perform aspects of the described functions using special-purpose hardware.

At 1605, the method may include communicating with a device in a wireless network according to a first communication mode, the first communication mode including a periodic DRX mode. The operations of 1605 may be performed in accordance with examples as disclosed herein. In some aspects, aspects of the operations of 1605 may be performed by a first mode component 725 as described with reference to FIG. 7.

At 1610, the method may include receiving a control message including a transition indication. The operations of 1610 may be performed in accordance with examples as disclosed herein. In some aspects, aspects of the operations of 1610 may be performed by a control component 740 as described with reference to FIG. 7.

At 1615, the method may include transitioning to a second communication mode based on receiving the control message comprising the transition indication, the second communication mode including an aperiodic DRX mode. The operations of 1615 may be performed in accordance with examples as disclosed herein. In some aspects, aspects of the operations of 1615 may be performed by a transition component 730 as described with reference to FIG. 7.

At 1620, the method may include operating according to the second communication mode for a duration of time. The operations of 1620 may be performed in accordance with examples as disclosed herein. In some aspects, aspects of the operations of 1620 may be performed by a second mode component 735 as described with reference to FIG. 7.

Figure 17:
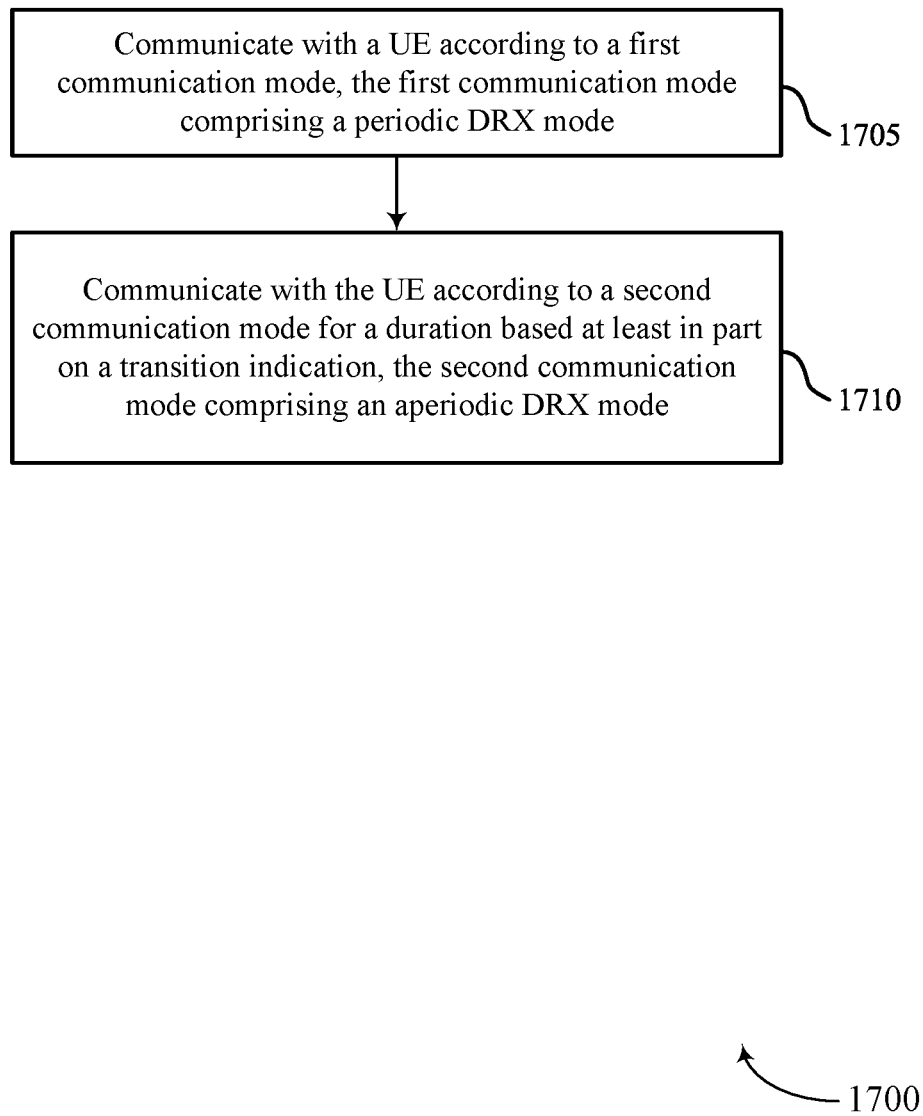

FIG. 17 shows a flowchart illustrating a method 1700 that supports techniques for aperiodic DRX mode communications in accordance with one or more aspects of the present disclosure. The operations of the method 1700 may be implemented by a device in a wireless network such as a base station or its components as described herein or a UE or its components as described herein. For example, the operations of the method 1700 may be performed by a base station 105 or a UE 115 as described with reference to FIGS. 1 through 12. In some aspects, a base station or a UE may execute a set of instructions to control the functional elements of the base station or the UE, respectively, to perform the described functions. Additionally or alternatively, the base station or the UE may perform aspects of the described functions using special-purpose hardware.

At 1705, the method may include communicating with a UE according to a first communication mode, the first communication mode including a periodic DRX mode. The operations of 1705 may be performed in accordance with examples as disclosed herein. In some aspects, aspects of the operations of 1705 may be performed by a first mode component 1125 as described with reference to FIG. 11.

At 1710, the method may include communicating with the UE according to a second communication mode for a duration based on a transition indication, the second communication mode including an aperiodic DRX mode. The operations of 1710 may be performed in accordance with examples as disclosed herein. In some aspects, aspects of the operations of 1710 may be performed by a second mode component 1130 as described with reference to FIG. 11.

Figure 18:
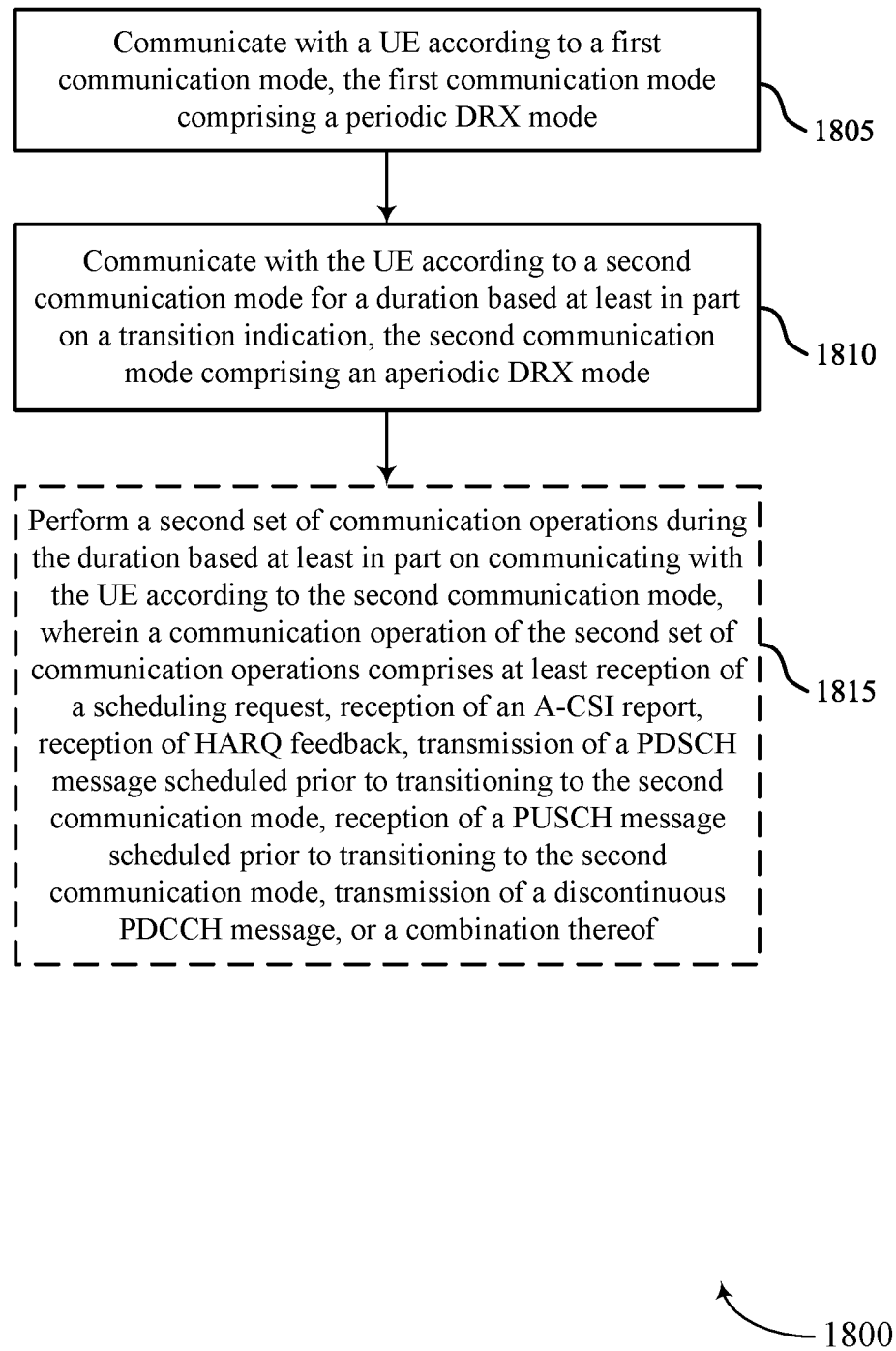

FIG. 18 shows a flowchart illustrating a method 1800 that supports techniques for aperiodic DRX mode communications in accordance with one or more aspects of the present disclosure. The operations of the method 1800 may be implemented by a device in a wireless network such as a base station or its components as described herein or a UE or its components as described herein. For example, the operations of the method 1800 may be performed by a base station 105 or a UE 115 as described with reference to FIGS. 1 through 12. In some aspects, a base station or a UE may execute a set of instructions to control the functional elements of the base station to perform the described functions. Additionally or alternatively, the base station or the UE may perform aspects of the described functions using special-purpose hardware.

At 1805, the method may include communicating with a UE according to a first communication mode, the first communication mode including a periodic DRX mode. The operations of 1805 may be performed in accordance with examples as disclosed herein. In some aspects, aspects of the operations of 1805 may be performed by a first mode component 1125 as described with reference to FIG. 11.

At 1810, the method may include communicating with the UE according to a second communication mode for a duration based on a transition indication, the second communication mode including an aperiodic DRX mode. The operations of 1810 may be performed in accordance with examples as disclosed herein. In some aspects, aspects of the operations of 1810 may be performed by a second mode component 1130 as described with reference to FIG. 11.

At 1815, the method may include performing a second set of communication operations during the duration based on communicating with the UE according to the second communication mode, wherein a communication operation of the second set of communication operations includes at least reception of a scheduling request, reception of an A-CSI report, reception of HARQ feedback, transmission of a PDSCH scheduled prior to transitioning to the second communication mode, reception of a PUSCH message scheduled prior to transitioning to the second communication mode, transmission of a discontinuous PDCCH message, or a combination thereof. The operations of 1815 may be performed in accordance with examples as disclosed herein. In some aspects, aspects of the operations of 1815 may be performed by a second mode component 1130 as described with reference to FIG. 11.

Figure 19:
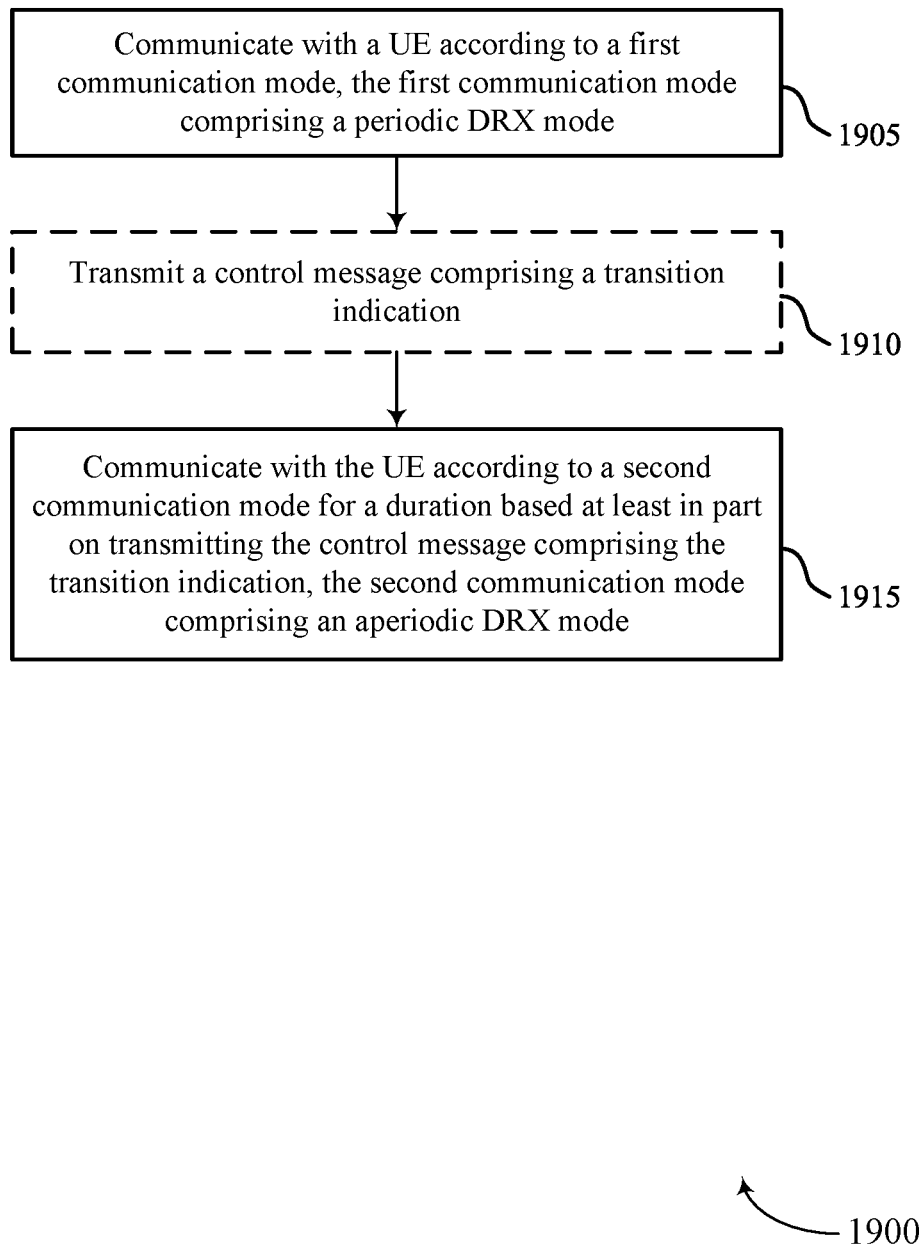

FIG. 19 shows a flowchart illustrating a method 1900 that supports techniques for aperiodic DRX mode communications in accordance with one or more aspects of the present disclosure. The operations of the method 1900 may be implemented by a device in a wireless network such as a base station or its components as described herein or a UE or its components as described herein. For example, the operations of the method 1900 may be performed by a base station 105 or a UE 115 as described with reference to FIGS. 1 through 12. In some aspects, a base station or a UE may execute a set of instructions to control the functional elements of the base station to perform the described functions. Additionally or alternatively, the base station or the UE may perform aspects of the described functions using special-purpose hardware.

At 1905, the method may include communicating with a UE according to a first communication mode, the first communication mode including a periodic DRX mode. The operations of 1905 may be performed in accordance with examples as disclosed herein. In some aspects, aspects of the operations of 1905 may be performed by a first mode component 1125 as described with reference to FIG. 11.

At 1910, the method may include transmitting a control message including a transition indication. The operations of 1910 may be performed in accordance with examples as disclosed herein. In some aspects, aspects of the operations of 1910 may be performed by a control component 1135 as described with reference to FIG. 11.

At 1915, the method may include communicating with the UE according to a second communication mode for a duration based on transmitting the transition indication, the second communication mode including an aperiodic DRX mode. The operations of 1915 may be performed in accordance with examples as disclosed herein. In some aspects, aspects of the operations of 1915 may be performed by a second mode component 1130 as described with reference to FIG. 11.

The following provides an overview of aspects of the present disclosure:

Aspect 1: A method for wireless communication at a UE, comprising: communicating with a device in a wireless network according to a first communication mode, the first communication mode comprising a periodic DRX mode; transitioning to a second communication mode based at least in part on a transition indication, the second communication mode comprising an aperiodic DRX mode; and operating according to the second communication mode for a duration of time.

Aspect 2: The method of aspect 1, wherein operating according to the second communication mode comprises: disabling a first set of communication operations for the duration.

Aspect 3: The method of aspect 2, wherein a communication operation of the first set of communication operations comprises at least monitoring of a PDCCH, measuring a CSI-RS, periodic reporting of CSI, semi-persistent reporting of the CSI, transmission of an SRS, reception of a semi-persistent message, or transmission of a configured grant message, or a combination thereof.

Aspect 4: The method of any of aspects 1 through 3, wherein operating according to the second communication mode comprises: performing a second set of communication operations during the duration.

Aspect 5: The method of aspect 4, wherein a communication operation of the second set of communication operations comprises at least transmission of a scheduling request, aperiodic reporting of CSI, transmission of HARQ feedback, reception of a PDSCH message scheduled prior to transitioning to the second communication mode, transmission of a PUSCH message scheduled prior to transitioning to the second communication mode, or discontinuous monitoring of a PDCCH, or a combination thereof.

Aspect 6: The method of any of aspects 1 through 5, further comprising: receiving a control message indicating a first set of communication operations that are disabled for the duration, a second set of communication operations that are enabled for the duration, or a combination thereof.

Aspect 7: The method of aspect 6, wherein the control message comprises a set of flags, each flag of the set of flags corresponding to a communication operation of the first set of communication operations or the second set of communication operations and indicating whether the communication operation is disabled or enabled.

Aspect 8: The method of any of aspects 1 through 7, further comprising: receiving a control message comprising the transition indication, wherein transitioning to the second communication mode is based at least in part on receiving the control message.

Aspect 9: The method of aspect 8, wherein the control message further comprises an indication of a time period for remaining in the second communication mode, the duration corresponding to the time period.

Aspect 10: The method of aspect 9, wherein the indication of the time period comprises an index of a set of indexes corresponding to a set of time periods for remaining in the second communication mode, the index corresponding to the time period, the set of time periods comprising the time period.

Aspect 11: The method of any of aspects 8 through 10, wherein the control message comprises a PDCCH message, a MAC-CE message, or a combination thereof.

Aspect 12: The method of any of aspects 1 through 5, wherein the transition indication comprises a timer associated with traffic inactivity between the UE and the device, the transitioning to the second communication mode based at least in part on an expiration of the timer.

Aspect 13: The method of any of aspects 1 through 12, further comprising: transmitting a capability message that indicates a delay associated with transitioning between the first communication mode and the second communication mode, wherein operating according to the second communication mode is based at least in part on the delay.

Aspect 14: The method of any of aspects 1 through 13, further comprising: skipping monitoring of a physical downlink shared channel occasion that occurs during the duration based at least in part on operating according to the second communication mode; transitioning from the second communication mode to the first communication mode based at least in part on an expiration of the duration; and transmitting, to the device, a feedback message that excludes acknowledgement information associated with the skipped physical downlink shared channel occasion based at least in part on operating according to the second communication mode during the physical downlink shared channel occasion.

Aspect 15: The method of any of aspects 1 through 13, further comprising: skipping monitoring of a physical downlink shared channel occasion that occurs during the duration based at least in part on operating according to the second communication mode; transitioning from the second communication mode to the first communication mode based at least in part on an expiration of the duration; and transmitting, to the device, a feedback message that includes acknowledgement information associated with the skipped physical downlink shared channel occasion.

Aspect 16: The method of any of aspects 1 through 15, further comprising: disabling one or more timers associated with the periodic DRX mode for the duration based at least in part on operating according to the second communication mode.

Aspect 17: The method of any of aspects 1 through 16, wherein the second communication mode is associated with a first set of component carriers of a carrier group, a second set of component carriers of a DRX group, or a combination thereof.

Aspect 18: A method for wireless communication at a device in a wireless network, comprising: communicating with a UE according to a first communication mode, the first communication mode comprising a periodic DRX mode; and communicating with the UE according to a second communication mode for a duration based at least in part on a transition indication, the second communication mode comprising an aperiodic DRX mode.

Aspect 19: The method of aspect 18, wherein the transition indication indicates for the UE to disable a first set of communication operations for the duration.

Aspect 20: The method of any of aspects 18 through 19, further comprising: performing a second set of communication operations during the duration based at least in part on communicating with the UE according to the second communication mode, wherein a communication operation of the second set of communication operations comprises at least reception of a scheduling request, reception of an A-CSI report, reception of HARQ feedback, transmission of a PDSCH message scheduled prior to transitioning to the second communication mode, reception of a PUSCH message scheduled prior to transitioning to the second communication mode, transmission of a discontinuous PDCCH message, or a combination thereof.

Aspect 21: The method of any of aspects 18 through 20, further comprising: transmitting, to the UE, a control message indicating a first set of communication operations that are disabled for the duration, a second set of communication operations that are enabled for the duration, or a combination thereof.

Aspect 22: The method of aspect 21, wherein the control message comprises a set of flags, each flag of the set of flags corresponding to a communication operation of the first set of communication operations or the second set of communication operations and indicating whether the communication operation is disabled or enabled.

Aspect 23: The method of any of aspects 18 through 22, further comprising: transmitting a control message comprising the transition indication, wherein communicating with the UE according to the second communication mode is based at least in part on transmitting the control message.

Aspect 24: The method of aspect 23, wherein the control message further comprises an indication of a time period for remaining in the second communication mode, the duration corresponding to the time period.

Aspect 25: The method of aspect 24, wherein the indication of the time period comprises an index of a set of indexes corresponding to a set of time periods for remaining in the second communication mode, the index corresponding to the time period, the set of time periods comprising the time period.

Aspect 26: The method of any of aspects 18 through 22, wherein the transition indication comprises a timer associated with traffic inactivity between the device and the UE, the communicating with the UE according to the second communication mode based at least in part on an expiration of the timer.

Aspect 27: The method of any of aspects 18 through 26, further comprising: receiving, from the UE, a capability message that indicates a delay associated with transitioning between the first communication mode and the second communication mode, wherein communicating with the UE according to the second communication mode is based at least in part on the delay.

Aspect 28: The method of any of aspects 18 through 27, further comprising: disabling one or more timers associated with the periodic DRX mode for the duration based at least in part on communicating with the UE according to the second communication mode.

Aspect 29: An apparatus for wireless communication at a UE, comprising a processor; memory coupled with the processor; and instructions stored in the memory and executable by the processor to cause the apparatus to perform a method of any of aspects 1 through 17.

Aspect 30: An apparatus for wireless communication at a UE, comprising at least one means for performing a method of any of aspects 1 through 17.

Aspect 31: A non-transitory computer-readable medium storing code for wireless communication at a UE, the code comprising instructions executable by a processor to perform a method of any of aspects 1 through 17.

Aspect 32: An apparatus for wireless communication at a device in a wireless network, comprising a processor; memory coupled with the processor; and instructions stored in the memory and executable by the processor to cause the apparatus to perform a method of any of aspects 18 through 28.

Aspect 33: An apparatus for wireless communication at a device in a wireless network, comprising at least one means for performing a method of any of aspects 18 through 28.

Aspect 34: A non-transitory computer-readable medium storing code for wireless communication at a device in a wireless network, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
      communicate with a device in a wireless network according to a first communication mode for a first duration of time, the first communication mode comprising a periodic discontinuous reception mode;
      transition to a second communication mode for a second duration of time based at least in part on a transition indication, the second communication mode comprising an aperiodic discontinuous reception mode; and
      disable a first set of communication operations across a plurality of configured component carriers for the second duration of time, wherein the first set of communication operations comprises a reception of a semi-persistent message, a transmission of a configured grant message, or a combination thereof.

2. The apparatus of claim 1, wherein, to disable the first set of communication operations, the one or more processors are further configured to cause the UE to:
   disable a monitoring of a physical downlink control channel, measurement of a channel state information-reference signal, a periodic report of channel state information, a semi-persistent report of the channel state information, a transmission of a sounding reference signal, or a combination thereof.

3. The apparatus of claim 1, wherein the one or more processors are further configured to cause the UE to:

perform a second set of communication operations during the second duration.

4. The apparatus of claim 3, wherein a communication operation of the second set of communication operations comprises the one or more processors being configured to cause the UE to:
transmit a scheduling request, aperiodically report channel state information, transmit hybrid automatic repeat request feedback, receive a physical downlink shared channel message scheduled prior to the transition to the second communication mode, transmit a physical uplink shared channel message scheduled prior to the transition to the second communication mode, or discontinuously monitor a physical downlink control channel, or a combination thereof.

5. The apparatus of claim 1, wherein the one or more processors are further configured to cause the UE to:
receive a control message that indicates the first set of communication operations that are disabled for the second duration, a second set of communication operations that are enabled for the second duration, or a combination thereof.

6. The apparatus of claim 5, wherein the control message comprises one or more flags, and wherein each flag of the one or more flags corresponds to a communication operation of the first set of communication operations or the second set of communication operations and indicates whether the communication operation is disabled or enabled.

7. The apparatus of claim 1, wherein the one or more processors are further configured to cause the UE to:
receive a control message comprising the transition indication, the transition to the second communication mode based at least in part on a reception of the control message.

8. The apparatus of claim 7, wherein the control message further comprises an indication of a time period to remain in the second communication mode, the second duration corresponding to the time period.

9. The apparatus of claim 8, wherein:
the indication of the time period comprises an index of a set of indexes corresponding to a set of time periods to remain in the second communication mode,
the index corresponds to the time period, and
the set of time periods comprises the time period.

10. The apparatus of claim 7, wherein the control message comprises a physical downlink control channel message, a medium access control-control element message, or a combination thereof.

11. The apparatus of claim 1, wherein the transition indication comprises a timer associated with traffic inactivity between the UE and the device, the transition to the second communication mode based at least in part on an expiration of the timer.

12. The apparatus of claim 1, wherein one or more processors are further configured to cause the UE to:
transmit a capability message that indicates a delay associated with the transition between the first communication mode and the second communication mode, the disablement of the first set of communication operations based at least in part on the delay.

13. The apparatus of claim 1, wherein one or more processors are further configured to cause the UE to:
skip monitoring of a physical downlink shared channel occasion that occurs during the second duration based at least in part on the one or more processors being configured to cause the UE to disable the first set of communication operations;
transition from the second communication mode to the first communication mode based at least in part on an expiration of the second duration; and
transmit, to the device, a feedback message that excludes acknowledgement information associated with the skipped physical downlink shared channel occasion based at least in part on the one or more processors being configured to cause the UE to disable the first set of communication operations during the physical downlink shared channel occasion.

14. The apparatus of claim 1, wherein one or more processors are further configured to cause the UE to:
skip monitoring of a physical downlink shared channel occasion that occurs during the second duration based at least in part on the one or more processors being configured to cause the UE to disable the first set of communication operations;
transition from the second communication mode to the first communication mode based at least in part on an expiration of the second duration; and
transmit, to the device, a feedback message that includes acknowledgement information associated with the skipped physical downlink shared channel occasion.

15. The apparatus of claim 1, wherein one or more processors are further configured to cause the UE to:
disable one or more timers associated with the periodic discontinuous reception mode for the second duration based at least in part on the one or more processors being configured to cause the UE to disable the first set of communication operations.

16. The apparatus of claim 1, wherein the plurality of configured component carriers are associated with a carrier group, a discontinuous reception group, or a combination thereof.

17. The apparatus of claim 1, further comprising:
one or more antennas operable to communicate according to the first communication mode, or to operate according to the second communication mode, or both.

18. An apparatus for wireless communication at a device in a wireless network, comprising:
one or more memories; and
one or more processors coupled with the one or more memories and configured to cause the device to:
communicate according to a first communication mode for a first duration of time, the first communication mode comprising a periodic discontinuous reception mode; and
communicate according to a second communication mode for a second duration of time based at least in part on a transition indication, the second communication mode comprising an aperiodic discontinuous reception mode, wherein the transition indication indicates to a user equipment (UE) to disable a first set of communication operations comprising a reception of a semi-persistent message, a transmission of a configured grant message, or a combination thereof, wherein the first set of communication operations are disabled across a plurality of configured component carriers for the second duration of time.

19. The apparatus of claim 18, wherein the one or more processors are further configured to cause the device to:
perform a second set of communication operations during the second duration based at least in part on communication according to the second communication mode, wherein a communication operation of the second set of communication operations comprises at least reception of a scheduling request, reception of an aperiodic channel state information report, reception of hybrid automatic repeat request feedback, transmission of a physical downlink shared channel message scheduled prior to a transition to the second communication mode, reception of a physical uplink shared channel message scheduled prior to the transition to the second communication mode, transmission of a discontinuous physical downlink control channel message, or a combination thereof.

20. The apparatus of claim 18, wherein the one or more processors are further configured to cause the device to:
transmit a control message that indicates the first set of communication operations that are disabled for the second duration, a second set of communication operations that are enabled for the second duration, or a combination thereof.

21. The apparatus of claim 20, wherein the control message comprises one or more flags, and wherein each flag of the one or more flags corresponds to a communication operation of the first set of communication operations or the second set of communication operations and indicates whether the communication operation is disabled or enabled.

22. The apparatus of claim 18, wherein the one or more processors are further configured to cause the device to:
transmit a control message comprising the transition indication, wherein the communication according to the second communication mode is based at least in part on a transmission of the control message.

23. The apparatus of claim 22, wherein the control message further comprises an indication of a time period to remain in the second communication mode, the second duration corresponding to the time period.

24. The apparatus of claim 18, wherein the transition indication comprises a timer associated with traffic inactivity between the device and the UE, the communication according to the second communication mode based at least in part on an expiration of the timer.

25. The apparatus of claim 18, wherein the one or more processors are further configured to cause the device to:
receive a capability message that indicates a delay associated with the transition between the first communication mode and the second communication mode, wherein the communication according to the second communication mode is based at least in part on the delay.

26. The apparatus of claim 18, further comprising:
one or more antennas operable to communicate according to the first communication mode, or to operate according to the second communication mode, or both.

27. A method for wireless communication at a user equipment (UE), comprising:
communicating with a device in a wireless network according to a first communication mode for a first duration of time, the first communication mode comprising a periodic discontinuous reception mode;
transitioning to a second communication mode for a second duration of time based at least in part on a transition indication, the second communication mode comprising an aperiodic discontinuous reception mode; and
disabling a first set of communication operations across a plurality of configured component carriers for the second duration of time, wherein the first set of communication operations comprises receiving a semi-persistent message, transmitting a configured grant message, or a combination thereof.

28. A method for wireless communication at a device in a wireless network, comprising:
communicating according to a first communication mode for a first duration of time, the first communication mode comprising a periodic discontinuous reception mode; and
communicating according to a second communication mode for a second duration of time based at least in part on a transition indication, the second communication mode comprising an aperiodic discontinuous reception mode, wherein the transition indication indicates to a user equipment (UE) to disable a first set of communication operations comprising a reception of a semi-persistent message, a transmission of a configured grant message, or a combination thereof, wherein the first set of communication operations are disabled across a plurality of configured component carriers for the second duration of time.

29. The method of claim 27, further comprising:
performing a second set of communication operations during the second duration.

30. The method of claim 27, further comprising:
receiving a control message indicating the first set of communication operations that are disabled for the second duration, a second set of communication operations that are enabled for the second duration, or a combination thereof.

31. The method of claim 27, further comprising:
receiving a control message comprising the transition indication, the transition to the second communication mode based at least in part on a reception of the control message.

32. The method of claim 28, further comprising:
performing a second set of communication operations during the second duration.

33. The method of claim 28, further comprising:
transmitting a control message indicating the first set of communication operations that are disabled for the second duration, a second set of communication operations that are enabled for the second duration, or a combination thereof.

34. The method of claim 28, further comprising:
transmitting a control message comprising the transition indication, wherein the communication according to the second communication mode is based at least in part on transmitting the control message.

35. A non-transitory computer-readable medium storing code for wireless communication at a user equipment (UE), the code comprising instructions executable by one or more processors to cause the UE to:
communicate with a device in a wireless network according to a first communication mode for a first duration of time, the first communication mode comprising a periodic discontinuous reception mode;
transition to a second communication mode for a second duration of time based at least in part on a transition indication, the second communication mode comprising an aperiodic discontinuous reception mode; and
disable a first set of communication operations across a plurality of configured component carriers for the second duration of time, wherein the first set of communication operations comprise a reception of a semi-persistent message, a transmission of a configured grant message, or a combination thereof.

36. The non-transitory computer-readable medium of claim 35, wherein the instructions to operate according to the second communication mode are executable by the one or more processors to cause the UE to:
perform a second set of communication operations during the second duration.

37. The non-transitory computer-readable medium of claim 35, wherein the instructions are further executable by the one or more processors to cause the UE to:
receive a control message indicating the first set of communication operations that are disabled for the second duration, a second set of communication operations that are allowed for the second duration, or a combination thereof.

38. The non-transitory computer-readable medium of claim 35, wherein the instructions are further executable by the one or more processors to cause the UE to:
receive a control message comprising the transition indication, wherein transitioning to the second communication mode is based at least in part on receiving the control message.

39. A non-transitory computer-readable medium storing code for wireless communication at a device in a wireless network, the code comprising instructions executable by one or more processors to cause the device to:
communicate according to a first communication mode for a first duration of time, the first communication mode comprising a periodic discontinuous reception mode; and
communicate according to a second communication mode for a second duration of time based at least in part on a transition indication, the second communication mode comprising an aperiodic discontinuous reception mode, wherein the transition indication indicates to a user equipment (UE) to disable a first set of communication operations comprising a reception of a semi-persistent message, a transmission of a configured grant message, or a combination thereof, wherien the first set of communication operations are disabled across a plurality of configured component carriers for the second duration of time.

40. The non-transitory computer-readable medium of claim 39, wherein the instructions are further executable by the one or more processors to cause the device to:
perform a second set of communication operations during the second duration.

41. The non-transitory computer-readable medium of claim 39, wherein the instructions are further executable by the one or more processors to cause the device to:
transmit a control message indicating the first set of communication operations that are disabled for the second duration, a second set of communication operations that are enabled for the second duration, or a combination thereof.

42. The non-transitory computer-readable medium of claim 39, wherein the instructions are further executable by the one or more processors to cause the device to:
transmit a control message comprising the transition indication, wherein the communication according to the second communication mode is based at least in part on transmitting the control message.

* * * * *